(12) United States Patent
Becher

(10) Patent No.: US 11,072,401 B2
(45) Date of Patent: Jul. 27, 2021

(54) OFFSHORE FLOATING LIVING PREMISES, LABORATORY AND SUBMERSIBLE PLANKTON PUMP TOWER PUMP AND SUBMERSIBLE AERATED RESEARCH MANNED ACTUATED VEHICLE

(71) Applicant: Yona Becher, Budd Lake, NJ (US)

(72) Inventor: Yona Becher, Budd Lake, NJ (US)

( * ) Notice: Subject to any disclaimer, the term of this patent is extended or adjusted under 35 U.S.C. 154(b) by 0 days.

(21) Appl. No.: 16/974,091

(22) Filed: Sep. 25, 2020

(65) Prior Publication Data

US 2021/0039757 A1 Feb. 11, 2021

(51) Int. Cl.
*B63B 35/44* (2006.01)
*E02B 17/00* (2006.01)

(52) U.S. Cl.
CPC .......... *B63B 35/44* (2013.01); *E02B 17/0004* (2013.01); *B63B 2035/442* (2013.01); *B63B 2035/4426* (2013.01); *E02B 2017/006* (2013.01); *E02B 2017/0073* (2013.01)

(58) Field of Classification Search
CPC ............ B63B 35/44; B63B 2035/4426; B63B 2035/442; E02B 2017/006; E02B 2017/0056
See application file for complete search history.

(56) References Cited

U.S. PATENT DOCUMENTS

| | | | |
|---|---|---|---|
| 6,981,823 B2 * | 1/2006 | Roraas | E02B 17/00 405/195.1 |
| 2011/0139043 A1 * | 6/2011 | Reed | E21B 15/006 108/139 |
| 2014/0366792 A1 * | 12/2014 | Steven | F03D 13/40 114/72 |
| 2018/0136144 A1 * | 5/2018 | Blunk | G01N 21/952 |
| 2019/0106182 A1 * | 4/2019 | Wee | B63B 35/38 |

* cited by examiner

*Primary Examiner* — Sean D Andrish

(57) ABSTRACT

An offshore ocean floating platform equipped with a docking bay with a hull made with multiple steel barrels welded to each other arranged in multiple layers, an upper deck with living premises, laboratory and control tower, having three submersible plankton pumping towers extending from above water level up to 120' depth, a manned and aerated research submersible vehicle with vertical travel controlled by a telescopic double acting actuator, including two telescopic aeration tubes providing atmospheric pressure air from above sea level, and safety return springs, sealed glass windows, water depth gage and video cameras. The upper deck having plankton pools plankton pumped from ocean floor by a piston traveling within a cylinder by double acting telescopic actuator for fishery feedings. All towers bottom-end secured to seabed dirt with multiple heavy cement poles with embedded cylinder and piston moving under ocean water high pressure into seabed dirt with self-drilling plungers.

1 Claim, 28 Drawing Sheets

OFFSHORE FLOATING LIVING PREMISES, LABORATORY AND SUBMERSIBLE PLANKTON PUMP TOWER PUMP AND SUBMERSIBLE AERATED RESEARCH MANNED ACTUATED VEHICLE

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO JOIN RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR JOINT INVENTOR

Not Applicable

BACKGROUND OF THE INVENTION

1. Field of the Invention

Oceans occupy more than 70% of the planet, but most of the food comes from the land, leaving the richness of million types of seafood and fish unchecked and undiscovered. Undoubtedly, agriculture used to produce food by growing plants on soil is limited to certain areas on the planet, where soil must have good quality nutrients and minerals, together with good weather and enough irrigation water. For thousands of years starting in ancient Egypt of the Middle East and far East islands and China fishermen sailing offshore on boats of small or large sizes used fishing rods and nets together with baits to catch fish in the beaches and offshore in seas, lakes, and oceans. However, fishing of wild grown fish and seafood brought back to shore only limited amount of limited readily available types and kinds, especially during bad weather and storms conditions, when fish went down deeper ocean floor unavailable for fishermen's fishing equipment. Unfortunately, the oceans deep floor became collection of millions of boats of all sizes from all times that fell victim to rough ocean turbulence conditions with many lives of fishermen gone and with their families waiting for them desperately to come back alive. Therefore, research of ocean floor became critical to supplying good nutrition and fresh fish and seafood to billions of people around the world at time when land agriculture provides limited amount of food to prevent starvation.

Plankton are the diverse collection of organisms that live in oceans and are unable to swim against a current. They provide a crucial source of food to many small and large aquatic organisms, such as bivalves, fish and whales. Plankton ecosystem representing the bottom few levels of a food chain that supports commercially important fisheries. Plankton plays a role in the biogeochemical cycles of many important chemical elements, including the ocean's carbon cycle. it might be possible to increase the ocean's uptake of carbon dioxide generated through human activities by increasing plankton production, thereby reduce the effect of global warming on ocean acidity. Phytoplankton absorb energy from the sun and nutrients from the water, producing their own nourishment or energy through the process of photosynthesis. It is estimated that about 50% of the world's oxygen is produced via phytoplankton photosynthesis. The growth of phytoplankton populations is dependent on light levels and nutrient availability, as these organisms form the base of the marine food web, influencing populations of zooplankton, fishes, sea birds, and marine mammals.

2. Description of the Related Art Including Information Disclosed Under 37 CFR 1.97 and 1.98

PRIOR ART

US-20200107525 2020 Fishermen's Island for growing 10,000 tons of fish and seafood in water-filled ring-tube fishery Inventor: Yona Becher A floating Fishermen's island for growing 10,000 tons of fish and seafood within multiple water-filled ring-tube fishery, including auxiliary fish growing pools and recreation boating, fishing and water sports amenities. The Island comprising equally spaced radial Island member array made of molded plastic emerging from a floating Island center with cylindrical ends pivoted to island center arms-ends and to island outer boat docking segments.

US-20190029231 2019 Floating water-filled ring tube for growing 2000 ton seafood and fish Inventor: Yona Becher Large capacity fish and seafood growing aquaculture comprises multiple floating at sea concentric transparent torus tubes with central barge equipped with air compressor, electronic controller and anchored to seabed. Floating level above sea level of aquaculture torus tube is controlled by floating level sensor input triggering compressor to inflatable helical balloon wrapped around aquaculture tube and commanded by electronic controller.

DE3202781A1 1982 diving rig and defense system Inventor: Peter Weber

Underwater diving rig and defense system, usable and designed in such a way that the pressure cell of the underwater vessel consists of two half shells of segment parts which can be produced according to a simple vertical sectioning method in such a way that a boat unit is obtained. Nevertheless, the inventor does not present a manned submersible vehicle for deep water research operated and aerated from above water level.

DE4229670A1 1992 teaches a transportable, immersible vehicle for transport from land into water.

Inventor: Henrik Muhs

The vehicle comprises several components releasably connected together, at least on component having lifting device and one having viewing surface The vehicle is composed of several components by releasably connected together by connecters and one or more components are provided with at least one lifting device. Nevertheless, the inventor does not present a manned submersible vehicle for deep water research operated and aerated from above water level.

U.S. Pat. No. 6,315,626B2 1998 Adhesively bonded pressure-resistant glass
bodies Inventor: Robert Parker, David Robinson, Anthony Simpson The invention in one variation is a pressure vessel having a pair of hemispheres with a wall and a circular edge, a pair of sealing elements, and an intervening mounting plate with circular groove on both sides of the plate. Nevertheless, the inventors do not present a manned vehicle for deep water research, operated, and aerated from above water level.

U.S. Pat. No. 6,321,676B1 1999 Underwater craft having sealed and inflatable buoyancy chambers Inventor: William Kohnen, Ian Sheard An underwater craft having a buoyancy control system, multi-sealed passenger chamber and emergency shut-off for external operation using inherent buoyancy of the craft. Nevertheless, the inventors do not present a manned submersible vehicle for deep water research operated and aerated from above water level.

US20120073490A1 2010 Sealable dome
assembly Inventor: Fernando Navarrete, Maria Fuente Submarine vehicle comprising a spherical cabin of transparent material, removable in two semi-spherical caps, to which is attached, in a support structure also removable, an immersion system with floats and counterweight ingots all removable. Nevertheless, the inventors do not present a manned submersible vehicle for deep water research operated and aerated from above water level.

US20120188696A1 2009 Marine housing for a submersible
instrument Inventor: Roger Gildseth, Dag Skyrud The invention is a method for housing a marine submersible instrument, providing two or more shell portions for forming a complete shell with a cavity assembling said shell portions around said instrument. Nevertheless, the inventors do not present a manned submersible vehicle for deep water research, operated, and aerated from above water level.

U.S. Pat. No. 8,333,295B1 2009 Pressure vessel
Inventor: Robert Parker, David Robinson, Anthony Simpson The invention in one variation is a pressure vessel having a pair of hemispheres with a wall and a circular edge, a pair of sealing elements, and an intervening mounting plate with circular groove on both sides of the plate. Nevertheless, the inventors do not present a manned vehicle for deep water research, operated, and aerated from above water level.

EP3257740A1 2016 A glass sphere type pressure housing including titanium band and a multi-joint underwater robot system for deep sea exploration using the same. A deep-sea exploration multi-joint underwater robot system and a spherical glass pressure housing including a titanium band are provided. Nevertheless, the inventors do not present a manned vehicle for deep water research, operated, and aerated from above water level.

ES2672152A1 2016 SUBMARINE VEHICLE
Inventor: A Ianuzzi

A deep ocean submersible including a pair of glass shells which are adapted to mate with one another about their rims to form a submersible hull; each shell having a peripheral lip which extends outwardly from the rim thereof. Nevertheless, the inventor does not present a manned vehicle for deep water research, operated, and aerated from above water level.

U.S. Pat. No. 4,679,964A (1984) Offshore well support mini
platform Inventor: Joseph W. Blandford For use with a subsea well incorporating an external conductor pipe extending upwardly above the seabed, a well support mini platform is set forth. Nevertheless, the inventor does not present a floating bay made with multi-barrel layers, with submersible Plankton pumping tower extending from above water, secured to seabed with multiple pressure operated threaded self-drilling shanks.

U.S. Pat. No. 4,983,074A (1989) Offshore support structure method and
apparatus Inventor: Samuel C. Carruba A method and apparatus for offshore support structures utilizes a hollow pile disposed within one leg of a three-legged structure to support an offshore platform. Nevertheless, the inventor does not present a floating bay made with multi-barrel layers, with submersible Plankton pumping tower extending from above water, secured to seabed with multiple pressure operated threaded self-drilling shanks.

U.S. Pat. No. 4,781,497A 1987 Tension-restrained articulated platform
tower Inventors: Demir Karsan, Shaddy Hanna, Jimmy Yeung A tension-restricted articulated platform tower for offshore oil and gas production. Two or more tower segments of increasing lateral dimension are stacked and articulated by means of a resilient joint. Nevertheless, the inventors do not present a floating bay made with multi-barrel layers, with submersible Plankton pumping tower extending from above water, secured to seabed with multiple pressure operated threaded self-drilling shanks.

US4867611A 1987 Installation of multipiece jackets using a lead docking pole
Inventors: Arthur L Guy, Jr John B Reber A method for joining two or more jacket or substructure components of an offshore platform in the water to form a single jacket unit. Nevertheless, the inventors do not present a floating bay made with multi-barrel layers, with submersible Plankton pumping tower extending from above water, secured to seabed with multiple pressure operated threaded self-drilling shanks.

U.S. Pat. No. 4,917,541A 1989 Offshore support structure method and
apparatus Inventor: Samuel C. Carruba A method and apparatus for offshore support structures utilize a central support having three legs interconnected with an outrigger support structure comprised of at least two legs and at least one hollow pile. Nevertheless, the inventor does not present a floating bay made with multi-barrel layers, with submersible Plankton pumping tower extending from above water, secured to seabed with multiple pressure operated threaded self-drilling shanks.

U.S. Pat. No. 5,356,239A 1992 Universal modular platform method and
apparatus Inventor: James E. Armstrong Disclosed is an improved fixed offshore platform and method of erecting the same. The platform has an open truss structure with upper and lower deck levels. Nevertheless, the inventor does not present a floating bay made with multi-barrel layers, with submersible Plankton pumping tower extending from above water, secured to seabed with multiple pressure operated threaded self-drilling shanks.

BR9203617A 1992 Reticulated structure with wide base for offshore platform support the present invention relates to a kind of shock mitigation system, particularly relate to a kind of shock mitigation system be applied on ocean platform. Nevertheless, the inventors do not present a floating bay made with multi-barrel layers, with submersible Plankton pumping tower extending from above water, secured to seabed with multiple pressure operated threaded self-drilling shanks.

GB9321078D0 1993 Offshore tower structure and method of installation Inventors: Malcolm Frame, Majid Hesar, Jayan Varghese,
David Woodgate A tower structure for offshore oil and gas fields is formed from various vertically spaced and interconnected tower sections. Nevertheless, inventors do not present a floating bay made with multi-barrel layers, with submersible Plankton pumping tower extending from above water, secured to seabed with multiple pressure operated threaded self-drilling shanks.

CN103572853A 2012 Ocean platform shock mitigation system

The present invention relates to a kind of shock mitigation system, particularly relate to a kind of shock mitigation system be applied on ocean platform. Nevertheless, the inventors do not present a floating bay made with multi-barrel layers, with submersible Plankton pumping tower extending from above water, secured to seabed with multiple pressure operated threaded self-drilling shanks.

ES2252026T3 1999 Compact sub-structure of platform of tensed cables.
Inventors: Pieter G. Wybro, Shakai Wu A system and method for mating risers or umbilicals extending vertically or near vertically from the ocean floor to a floating offshore system. Nevertheless, the inventors do not present a floating bay made with multi-barrel layers, with submersible Plankton pumping tower extending from above water, secured to seabed with multiple pressure operated threaded self-drilling shanks.

EP2004954B1 2006 Pre-assembly of a subsea base and pipeline Inventor: Joop Roodenburg, Diederick Bernardus Wijning The invention relates to a method for subsea hydrocarbon recovery in which a wellbore is drilled using a base installed on the seabed. Nevertheless, the inventors do not present a floating bay made with multi-barrel layers, with submersible Plankton pumping tower extending from above water, secured to seabed with multiple pressure operated threaded self-drilling shanks.

U.S. Pat. No. 8,647,017B2 2011Gravity base structure Inventor: John Waddell

The invention provides an improved structure for standing offshore, particularly in arctic environments, and a method for installing this structure. The structure comprises a shield portion which rests on a seabed and primarily resists environmental loads.

Nevertheless, the inventor does not present a floating bay made with multi-barrel layers, with submersible Plankton pumping tower extending from above water, secured to seabed with multiple pressure operated threaded self-drilling shanks.

SG193101A1 2012 Riser protection structures Inventor: Kok Seng Foo, Michael Perry, Chin Quah The present invention provides a riser protection structure being suitable to be employed in a Jackup rig. The riser protection structure comprises a plurality of piles and an upper module. Nevertheless, the inventors do not present a floating bay made with multi-barrel layers, with submersible Plankton pumping tower extending from above water, secured to seabed with multiple pressure operated threaded self-drilling shanks.

WO2017176789A1 2016 Modular wellhead Inventor: Jan Jortveit

A modular lightweight rig comprising a plurality of modules designed to be placed on a platform deck and to support a drilling deck on which a derrick (11) is designed to be placed. Nevertheless, the inventor does not present a floating bay made with multi-barrel layers, with submersible Plankton pumping tower extending from above water, secured to seabed with multiple pressure operated threaded self-drilling shanks.

CN108560524B *2018 Installation method for offshore early drilling and later platform Inventor: Joseph Blandford, Manit Srivareerat An offshore production platform for use with at least one well located in a body of water comprises a rigid lower trapezoidal base support structure and an upper pyramidal support structure, both located below the surface of the body of water. Nevertheless, the inventors do not present a floating bay made with multi-barrel layers, with submersible Plankton pumping tower extending from above water, secured to seabed with multiple pressure operated threaded self-drilling shanks.

AU2012279291B22016 Offshore platform with outset columns Inventors: Xiaoqiang BIAN, Edward Large, Steven Leverette A tension leg platform, comprising buoyant columns having a generally polygonal transverse cross section and buoyant pontoons interconnecting adjacent columns. Nevertheless, the inventors do not present a floating bay made with multi-barrel layers, with submersible Plankton pumping tower extending from above water, secured to seabed with multiple pressure operated threaded self-drilling shanks.

U.S. Pat. No. 6,047,781A 2000 Multi-activity offshore exploration and/or development drilling method and apparatus
Inventor: Robert Scott, Robert Herrmann, Donald Ra A multi-activity drillship, or the like, method and apparatus having a single derrick and multiple tubular activity stations within the derrick. Nevertheless, the inventors do not present a floating bay made with multi-barrel layers, with submersible Plankton pumping tower extending from above water, secured to seabed with multiple pressure operated threaded self-drilling shanks.

EP1339922B1 2008 Heave suppressed offshore drilling and production platform
Inventor: Qi Xu, Phillip Abbott, John Halkyard A heave suppressed, floating offshore drilling and production platform having vertical columns lateral trusses connecting adjacent columns, a deep-submerged plate supported from the bottoms of the columns by vertical truss legs, and a topside deck supported by the columns. Nevertheless, the inventors do not present a floating bay made with multi-barrel layers, with submersible Plankton pumping tower extending from above water, secured to seabed with multiple pressure operated threaded self-drilling shanks.

U.S. Pat. No. 6,666,624B2 2003 Floating, modular deepwater platform, and method of deployment
Inventor: Stephen B. Wetch A floating platform for use in a body of water comprises an uppermost buoyant and ballast able hull partially submerged in the water without contacting the floor of the body of water and usually without being moored to the floor of the body of water. Nevertheless, the inventor does not present a floating bay made with multi-barrel layers, with submersible Plankton pumping tower extending from above water, secured to seabed with multiple pressure operated threaded self-drilling shanks.

US4714382A1987 Method and apparatus for the offshore installation of multi-ton prefabricated deck packages on partially submerged offshore jacket foundations Inventor: James E. Armstong A fixed offshore platform and method of erecting the same. The platform has an open truss structure with upper and lower deck levels. The upper deck has removable floor sections to allow installation of equipment down through the truss structure. Nevertheless, the inventor does not present a floating bay made with multi-barrel layers, with submersible Plankton pumping tower extending from above water, secured to seabed with multiple pressure operated threaded self-drilling shanks.

U.S. Pat. No. 8,523,491-B2 2013 Year-round arctic drilling system Inventor: Qi Xu The disclosure provides an offshore platform and related method, having: a floating structure, a truss assembly coupled to the floating structure, and a heave plate coupled to the truss assembly. Nevertheless, the inventor does not present a floating bay made with multi-barrel layers, with submersible Plankton pumping tower extending from above water, secured to seabed with multiple pressure operated threaded self-drilling shanks U.S.-20190106182-A1 2020 Floating community Inventor: Charles I. Wee.

A floating modular unit that can be erected for use on land and bodies of water using adaptable transportable structures. Nevertheless, the inventor teaches a transportable structure kit to overcome flooding emergency and it not applicable for long term offshore ocean conditions. the inventor does not teach a multiple living premises on floating bay with docking means and with plankton pools, built on a multi steel barrel layers welded to each other to create a high buoyancy hull. In addition, the inventor does not teach submersible Plankton pumping towers and research vehicle tower extending from above water and secured to ocean floor with multiple pressure operated threaded self-drilling plungers.

US-20140366792A1 2014 Mobile barge and method of operation of mobile barge Inventor: Steven, lain Hughes A vessel comprising a primary platform moveably connected to a secondary platform by one or more legs is disclosed. The primary and secondary platform are moveable along the legs, wherein the secondary platform is moveable independently from the primary platform. Nevertheless, the inventor teaches mobile platform including living quarters extendable truss legs and an actuator comprising a jack for raising and lowering truss legs. Nevertheless, the inventor does not teach an offshore floating docking bay with multiple submersible Plankton pumping towers extending from above water and permanently secured to ocean floor with multiple pressure operated threaded self-drilling plungers. In addition, the inventor does not teach a truss tower with double acting telescopic actuator for raising and lowering a Plankton piston pump from the oceans floor into pools on floating docking bay. Furthermore, the inventor does not teach a submersible research vehicle tower with double acting telescopic actuator for raising and lowering a manned vehicle from ocean floor to water level.

U.S. Pat. No. 6,981,823-B2 2006 Method and arrangement for installation and removal of objects at sea Inventor: Roraas, Helge A deck structure is put on a vessel at a location inshore, then transported on the vessel to the offshore location and positioned relative to legs of a support structure standing on the sea bottom or the deck structure having deck legs corresponding to support legs on the support structure. Each of the legs including an actuator, wherein the actuator comprises a jack with an associated piston and a shock absorbing spring. Nevertheless, the inventor does not teach an offshore floating docking bay with multiple submersible Plankton pumping towers extending from above water and permanently secured to ocean floor with multiple pressure operated threaded self-drilling plungers. In addition, the inventor does not teach a submersible truss tower with double acting telescopic actuator for raising and lowering a piston with through hole and with check valve pumping Plankton from the oceans floor into pools on floating docking bay. Furthermore, the inventor does not teach a submersible research vehicle tower with double acting telescopic actuator for raising and lowering a manned vehicle from ocean floor to water level.

US-20110139043-A1 Drilling platform

Inventor: Reed, Alistair Ross

A structure consists of a platform on which drilling equipment can be positioned, and a plurality of legs extending from the platform to the ground. The legs of variable length are having telescoping legs and a hydraulic actuator, which allows the platform to be set horizontally even on uneven ground. Nevertheless, the inventor does not teach an offshore floating docking bay with multiple submersible pump towers extending from above water and permanently secured to ocean floor with multiple pressure operated threaded self-drilling plungers. In addition, the inventor does not teach a submersible truss tower with double acting telescopic actuator for raising and lowering a piston with through hole and with check valve pumping Plankton from the oceans floor into pools on floating docking bay. Furthermore, the inventor does not teach a submersible research vehicle tower with double acting telescopic actuator for raising and lowering a manned vehicle from ocean floor to water level.

US-20180136144-A1 2011

Inventor: Blunk, Ryan Michael

The invention using a plurality of video cameras system positioned on a moving frame for remote inspection of an object, such as an underwater steel pile. The inventor teaches a video camera attached to a submersible vehicle for remote inspection of an object, such as an underwater steel pile. Furthermore, the inventor does not teach a submersible research vehicle tower with double acting telescopic actuator for raising and lowering a manned vehicle from ocean floor to water level with video camera moving with the vehicle for researching living fish and Plankton at various water levels up to 120 feet depth. In addition, the video camera recorded videos are screened for researchers in the living premises and laboratory located on the docking bay.

BRIEF SUMMARY OF THE INVENTION

The present invention related to offshore floating ocean floor research platform with laboratory, living premises, Plankton pools, submersible Plankton pumping towers and submersible manned and aerated research vehicle reaching 120 feet deep. offshore floatable fishery in which fish are grown and fed within large volume of large internal diameter, large ring diameter tubes with large capacity of 10,000 tons would be using pumped from the ocean floor live plankton to feed the isolated fish and seafood in said tubes. The invention provide means to pump plankton from the bottom of the ocean up to 120 feet deep into isolated floating bay Plankton pools where they prepared to be pumped into the fishery ring-tubes through vertical connection pipe. The ocean provides unlimited amount of plankton of all types as food for growing fish and seafood, thereby avoiding feeding with land-grown food.

In addition, the purpose of this invention is to support offshore ocean floor research up to 120 feet deep by adding offshore ocean long-term living premises and in addition with biological and chemical well equipped laboratory to research ocean water acidity and pH, CO2 content which are proved to be affected by the global warming which affects the growth of shield in plankton and therefore causing damage to fisheries.

The invention includes submersible Plankton pumping tower extending from above water level and secured to the ocean floor seabed dirt up to 120 feet deep, equipped with double acting telescopic actuator attached to moving up and down piston within long multiple segment built cylinder with bottom check valve wherein said piston has a thru flow hole and a check valve pumping plankton and water from oceans floor and pumping it to above water level plankton pools.

The invention further includes a submersible vehicle tower equipped with a moving research deep-water seal manned and aerated research vehicle from above water level down to ocean floor up to 120' depth. The research vehicle is connected to double acting telescopic actuator and is aerated by dual telescopic air tubes connected to the top of the vehicle, providing atmospheric pressure from air blower located above sea level, and also equipped with two return spring guided within said air tubes for safe return to above water level in case of actuator malfunction. The research vehicle equipped with video cameras attached to glass windows of said vehicle with continuous recording of outside fish and plankton and providing video to be screened in above living premises. More research data including water temperature continuous water temperature recording and collecting water samples for biological and chemical analysis of water pH, oxygen and carbon content in the water.

In addition said Plankton pumping tower and vehicle towers are secured to ocean floor with multiple heavy cemented poles each equipped with embedded large diameter metallic cylinder with topside connection holes to ocean water, with sliding embedded pistons with threaded shaft extended downward with self-drilling plunger steel shanks using helical treading-in penetration into seabed dirt under water pressure downward force,

DETAIL DESCRIPTION OF THE INVENTION

| FIG. NO | SHEET NUMBER | FIG. NUMBER | REMARKS |
|---|---|---|---|
| 1 | 13, 97, 98, 52, 99 | 1 | |
| 2 | 11, 92, 97 | 1A | |
| 3 | 97, 11 | 1B | |
| 4 | 97, 12, 99 | 1C | |
| 5 | 27, 32, 32, 31 | 2 | |
| 6 | 16, 15, 18, 48 49, 50, 95 | 2A | |
| 7 | 98, 52, 95, 99 | 2B | |
| 8 | 16, 17, 26, 36, 93, 95 | 3 | |
| 9 | 17, 26, 28, 93, 95 | 3A | |
| 10 | 15, 19, 26, 34, 36, 51, 95 | 3B | |
| 11 | 15 | 3C | |
| 12 | 19, 37, 38, 41, 42, 44, 94, 96 | 4 | |

-continued

| FIG. NO | SHEET NUMBER | FIG. NUMBER | REMARKS |
|---|---|---|---|
| 13 | 34, 56, 68, 69, 70, 71, 72, 74, 77, 78 | 4A | |
| 14 | 34, 48, 49, 50, 98 | 4B | |
| 15 | 41, 42, 43, 44, 47 | 5 | |
| 16 | 43, 44, 45 | 5A | |
| 17 | 34, 51, 52, 53, 54, 68 | 6 | |
| 18 | 52, 56, 57, 58, 61, 79 | 6A | |
| 19 | 53, 54, 55, 56, 57, 58, | 6B | |
| 20 | 51,52, 55, 63,64, 68, 69, 70, 76 | 6C | |
| 21 | 62, 64, 67, 68, 72, 76, 77, 78 | 6D | |
| 22 | 35, 52, 53, 54, 55, 79, | 7 | |
| 23 | 52, 53, 54, 55 | 7A | |
| 24 | 51, 53, 54, 55, 55, 56 | 8 | |
| 25 | 68, 69, 70, 74, 77, 78 | 8A | |
| 26 | 65, 67, 68, 78 | 9 | |
| 27 | 73, 74, 77, 78 | 9A | |
| 28 | 80, 81, 82, 63, 83, 84, 85, 86, 87, 88 | 10 | |

LIST OF NUMERAL REFERENCES

Figure 1:
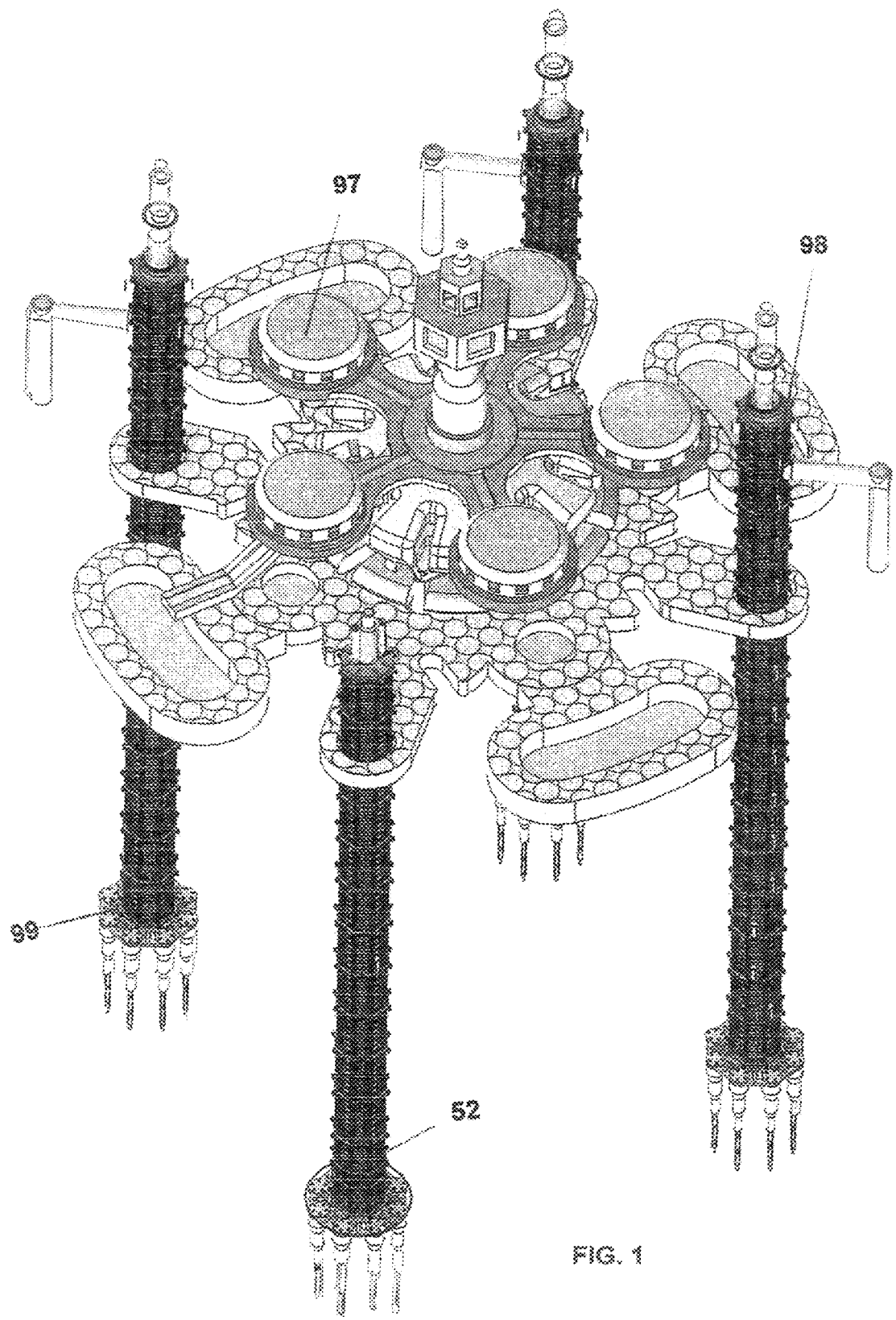
FIG. 1 presents an offshore floating platform with living premises, a laboratory, Plankton pools, three Plankton pumping towers and a vehicle tower
Figure 1A:
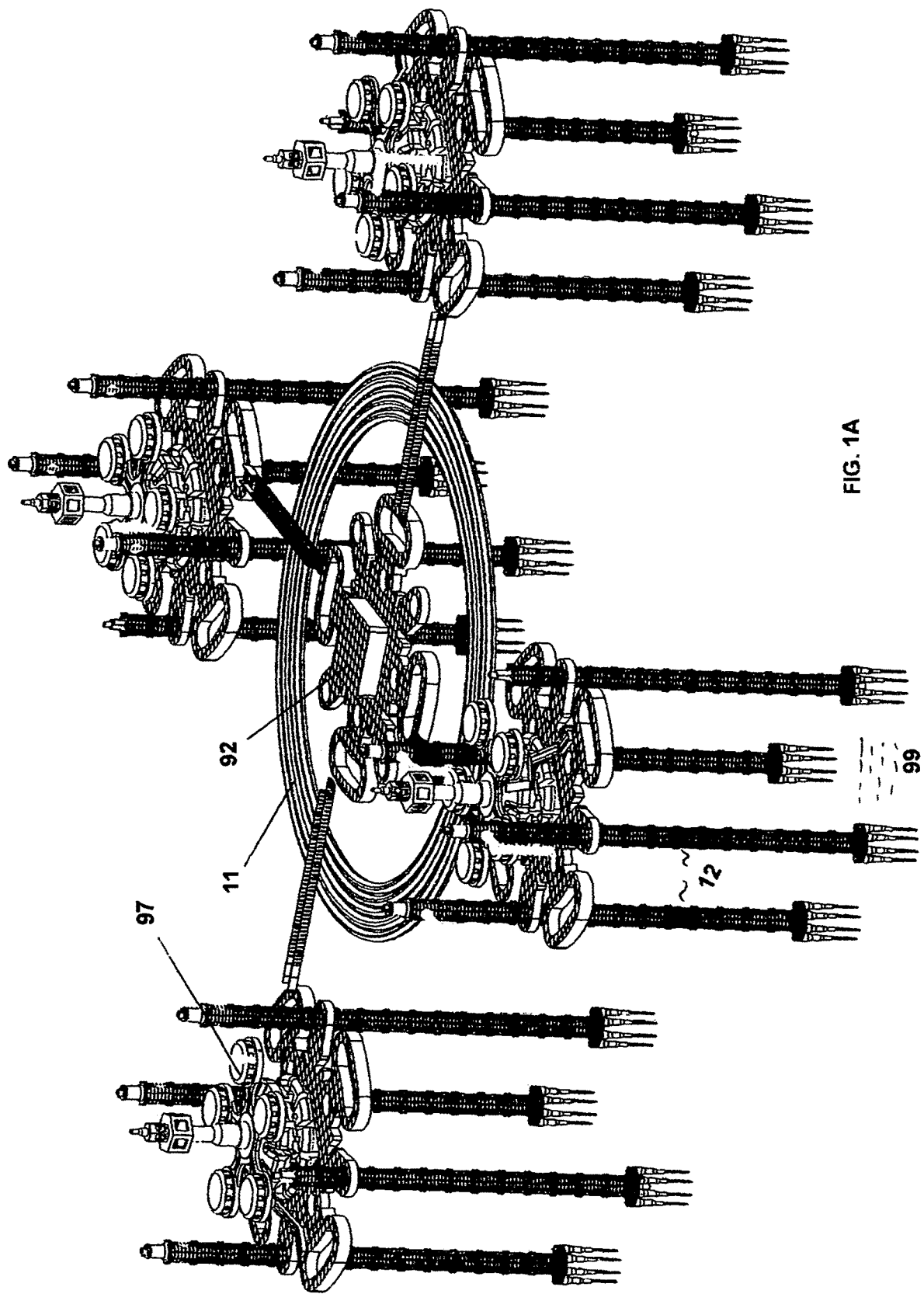
FIG. 1A presents four offshore floating platforms with a fishery and a center island
Figure 1B:
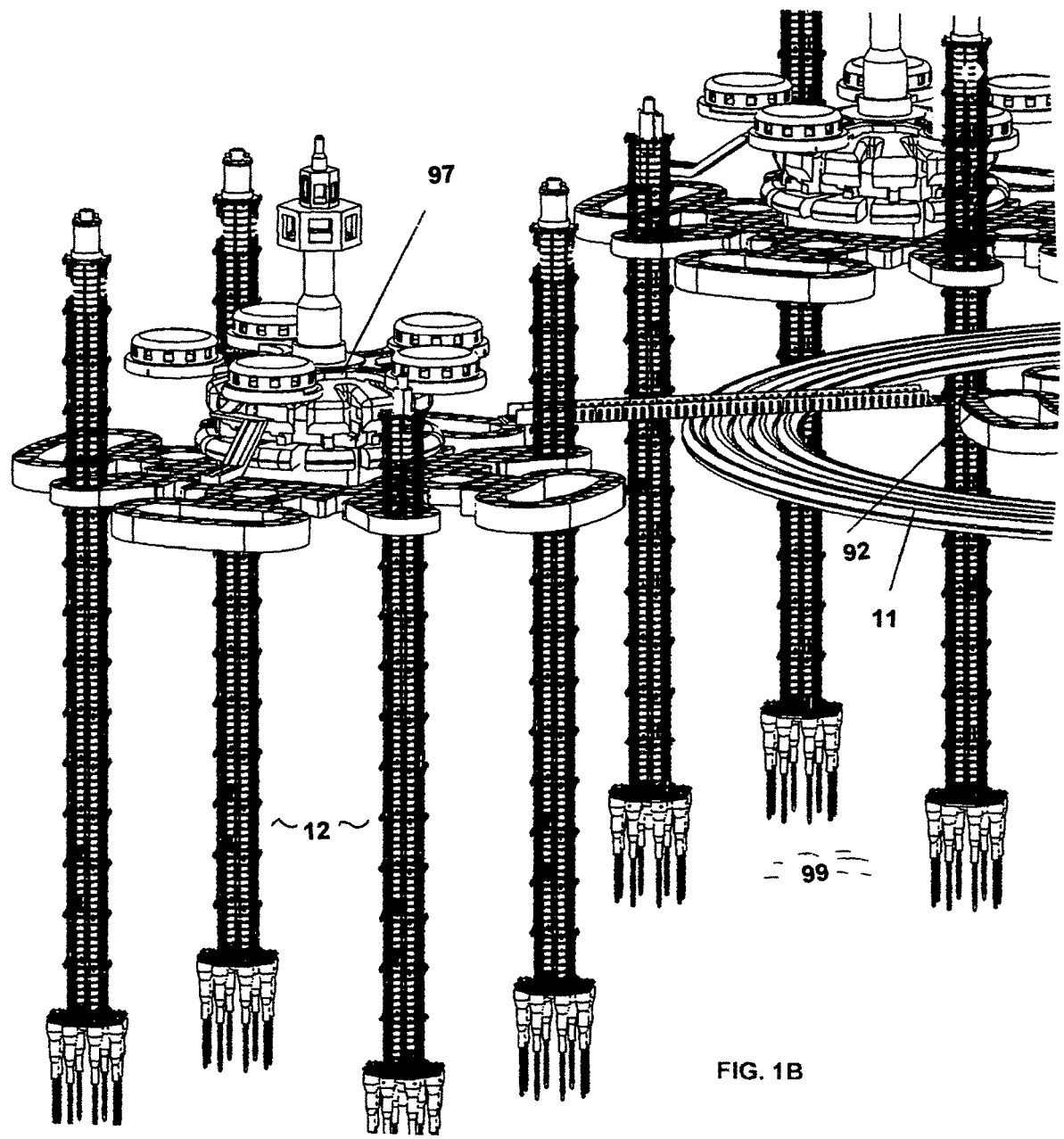
FIG. 1B presents detailed view of offshore floating platform with an upper deck, with three Plankton pumping towers and one vehicle tower secured to seabed and a fishery.
Figure 1C:
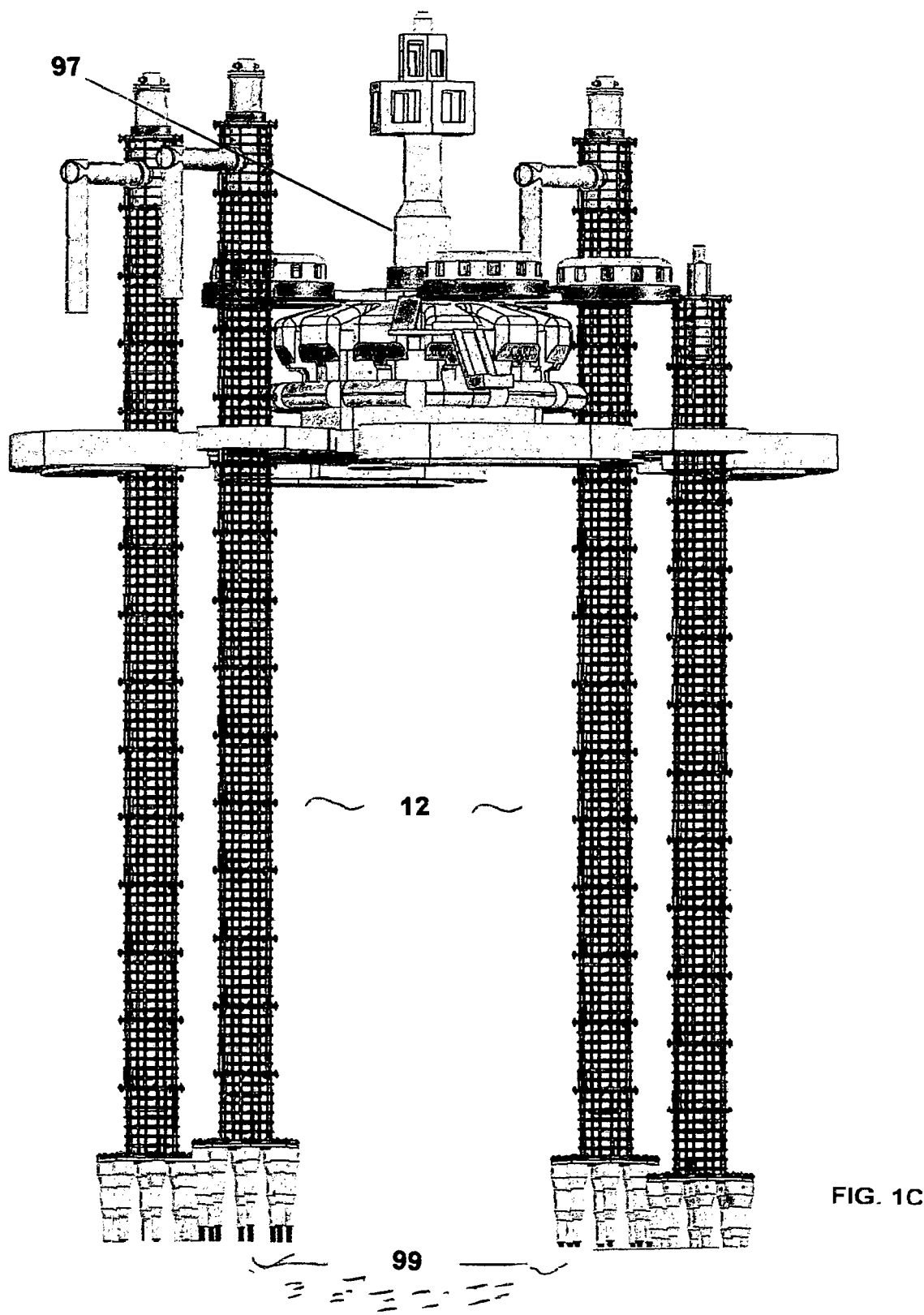
FIG. 1C presents an offshore floating platform with ocean water and seabed dirt.
Figure 2:
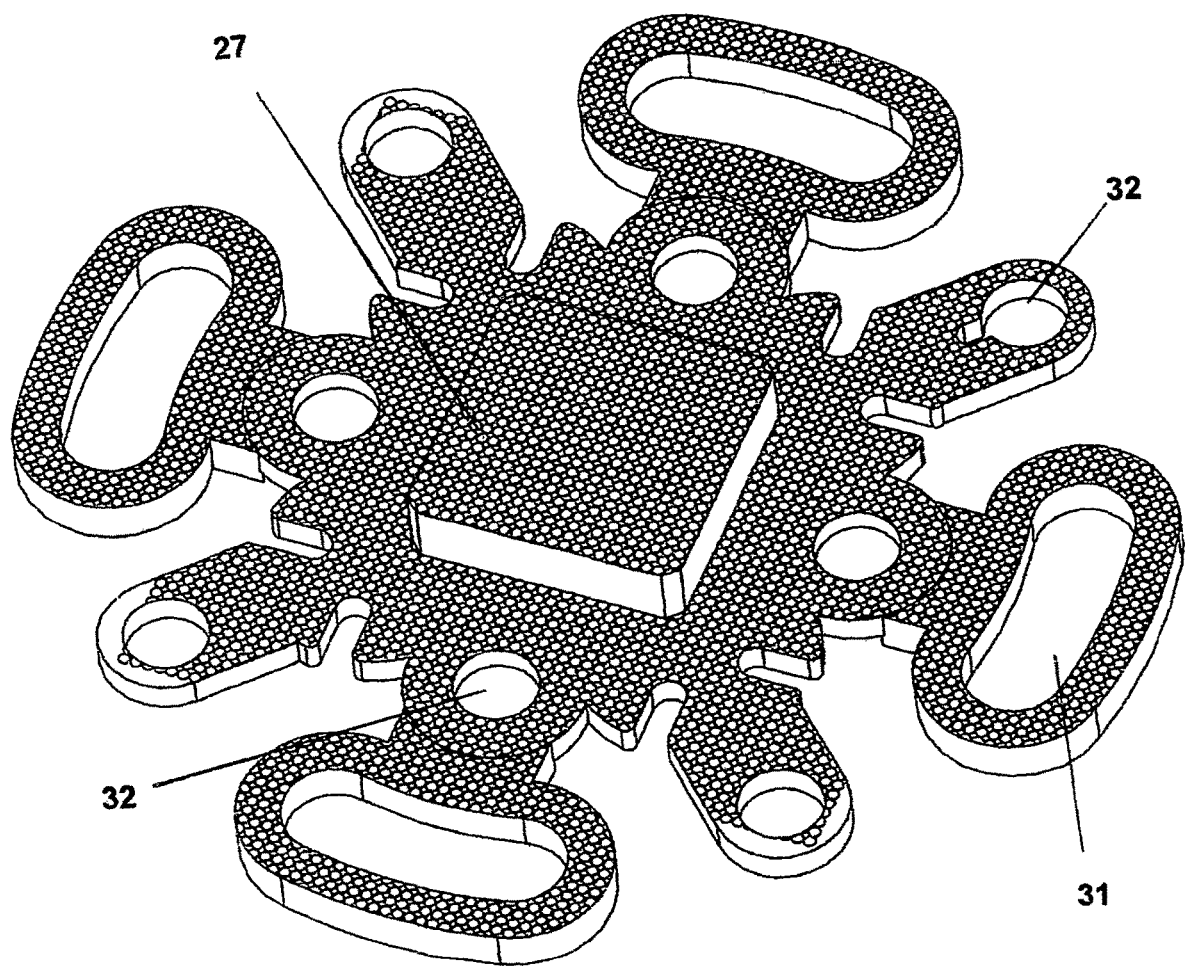
FIG. 2 presents a docking bay with a hull in its center.
Figure 2A:
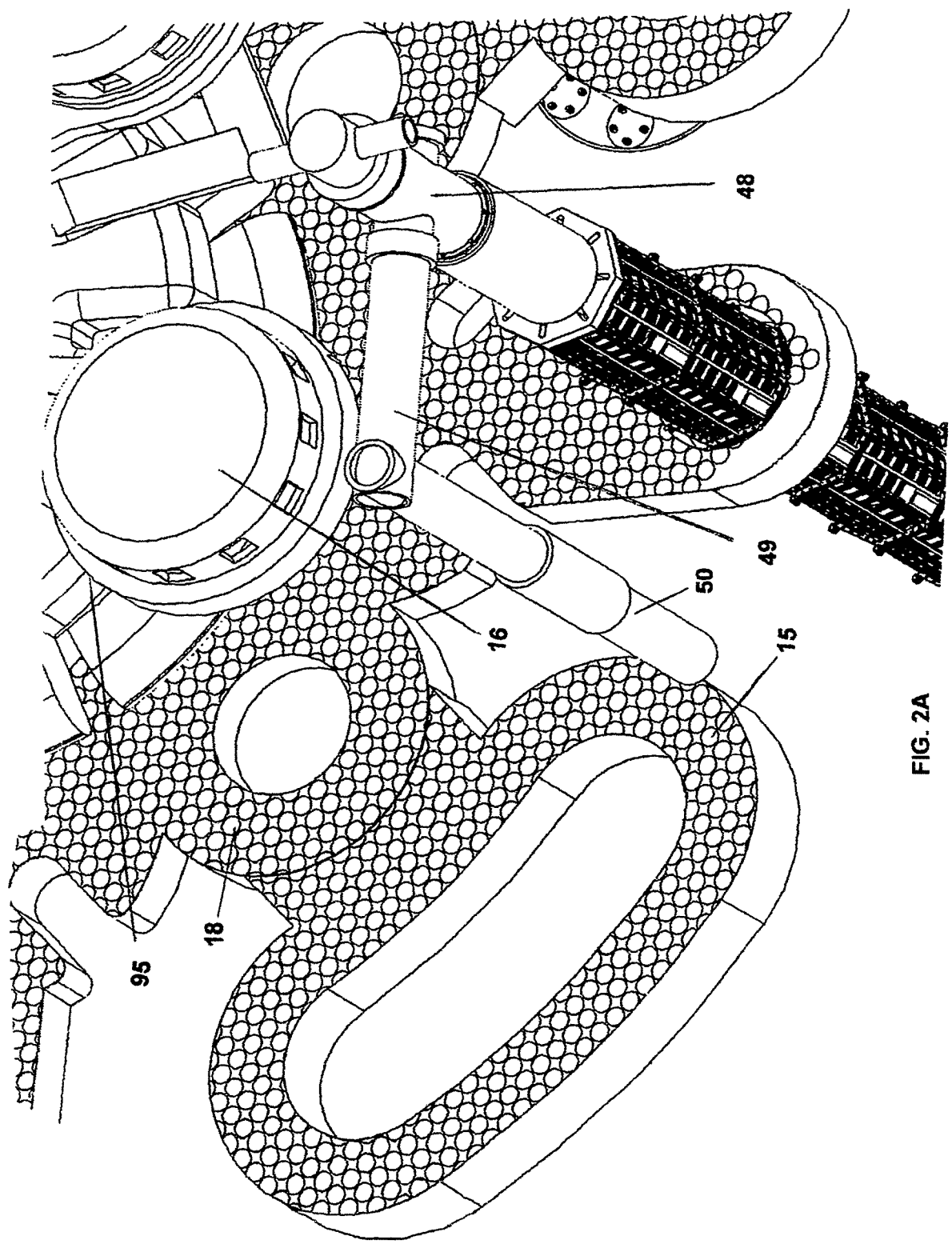
FIG. 2A presents an offshore floating platform with living premises, a laboratory, multiple Plankton pools, three Plankton pumping towers, a vehicle tower and a control tower.
Figure 3:
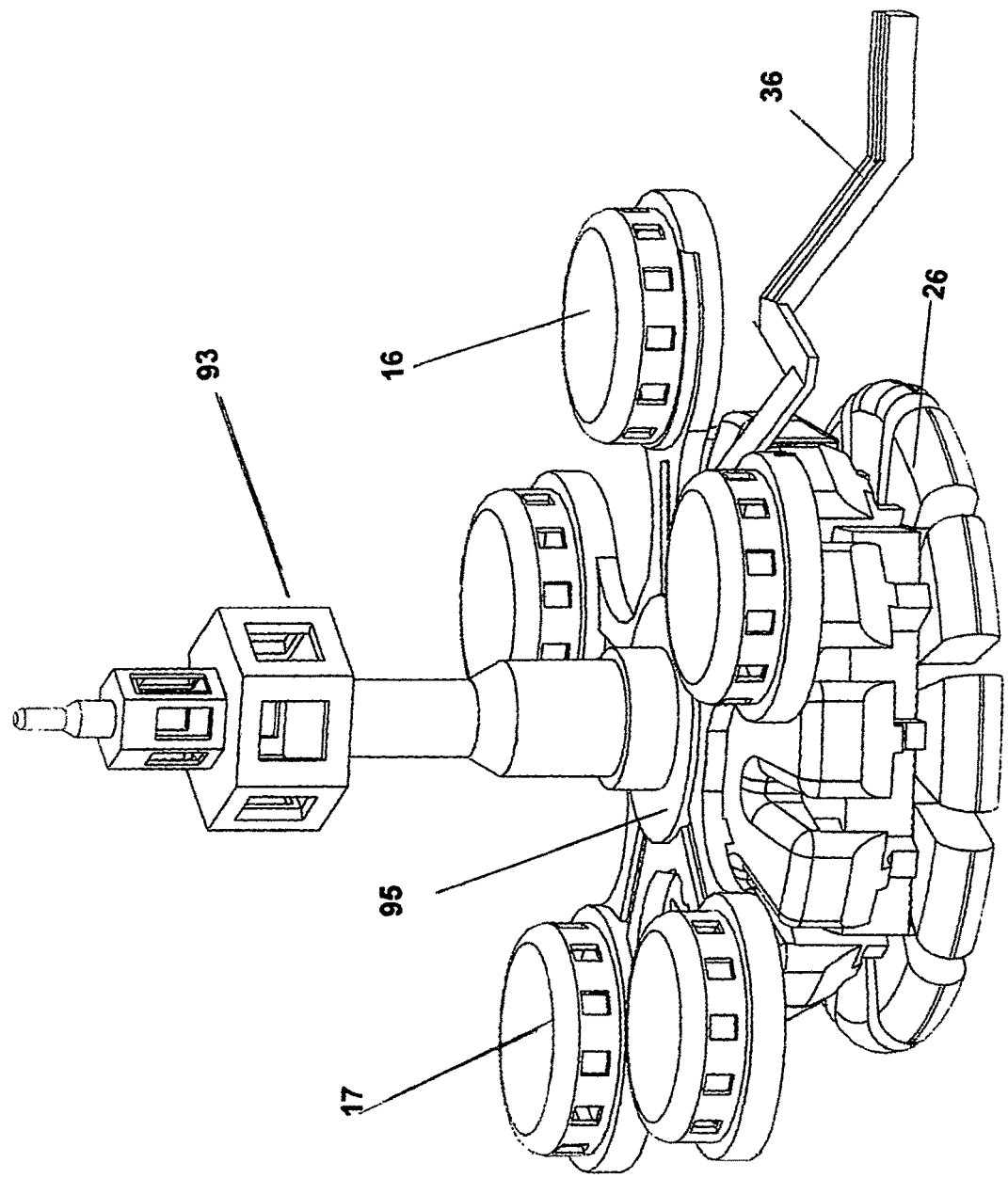
FIG. 3 presents an upper deck with living premises, a control tower and a slide.
Figure 3A:
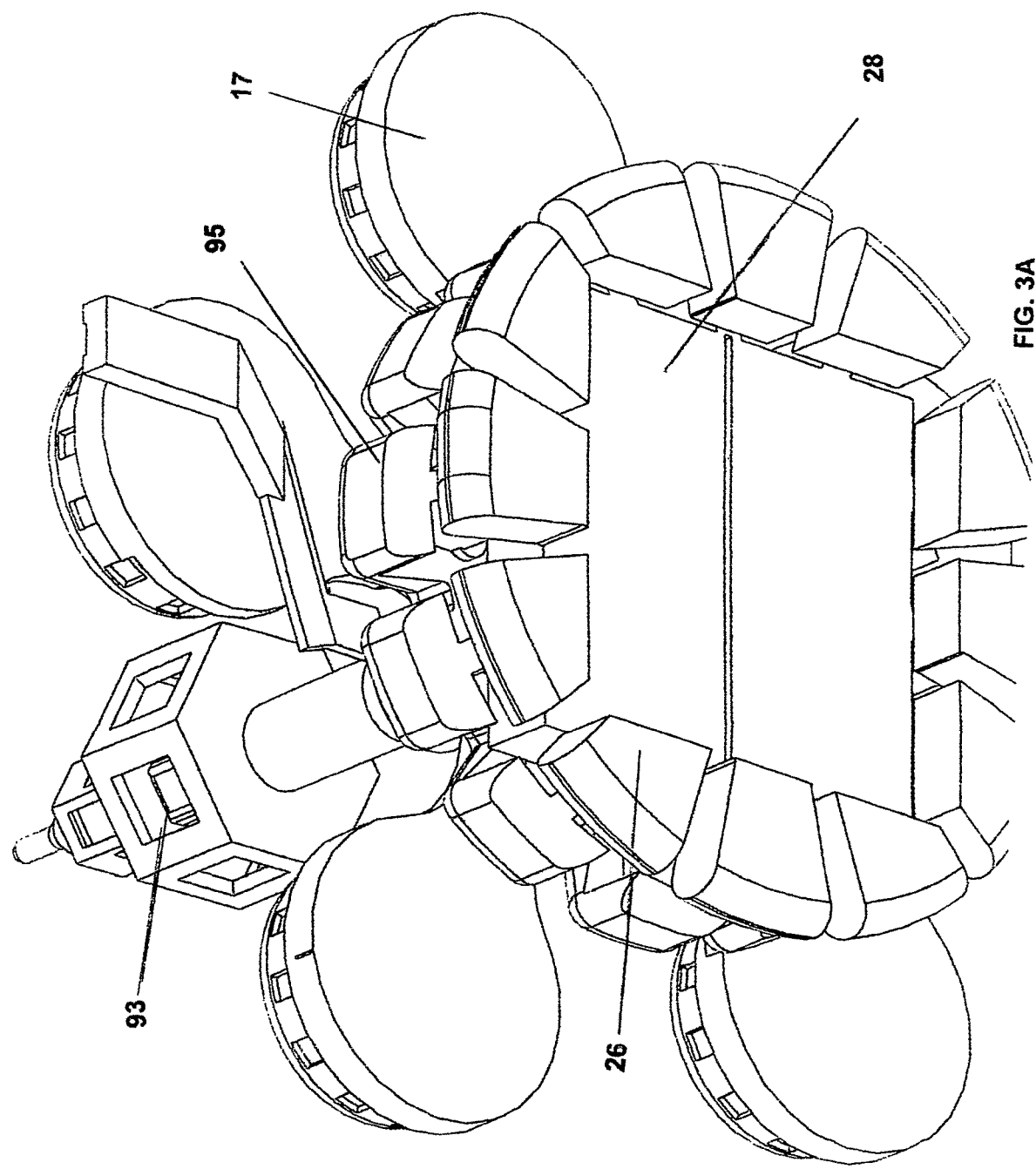
FIG. 3A presents an upper deck viewed from below with living premises and a control tower.
Figure 3B:
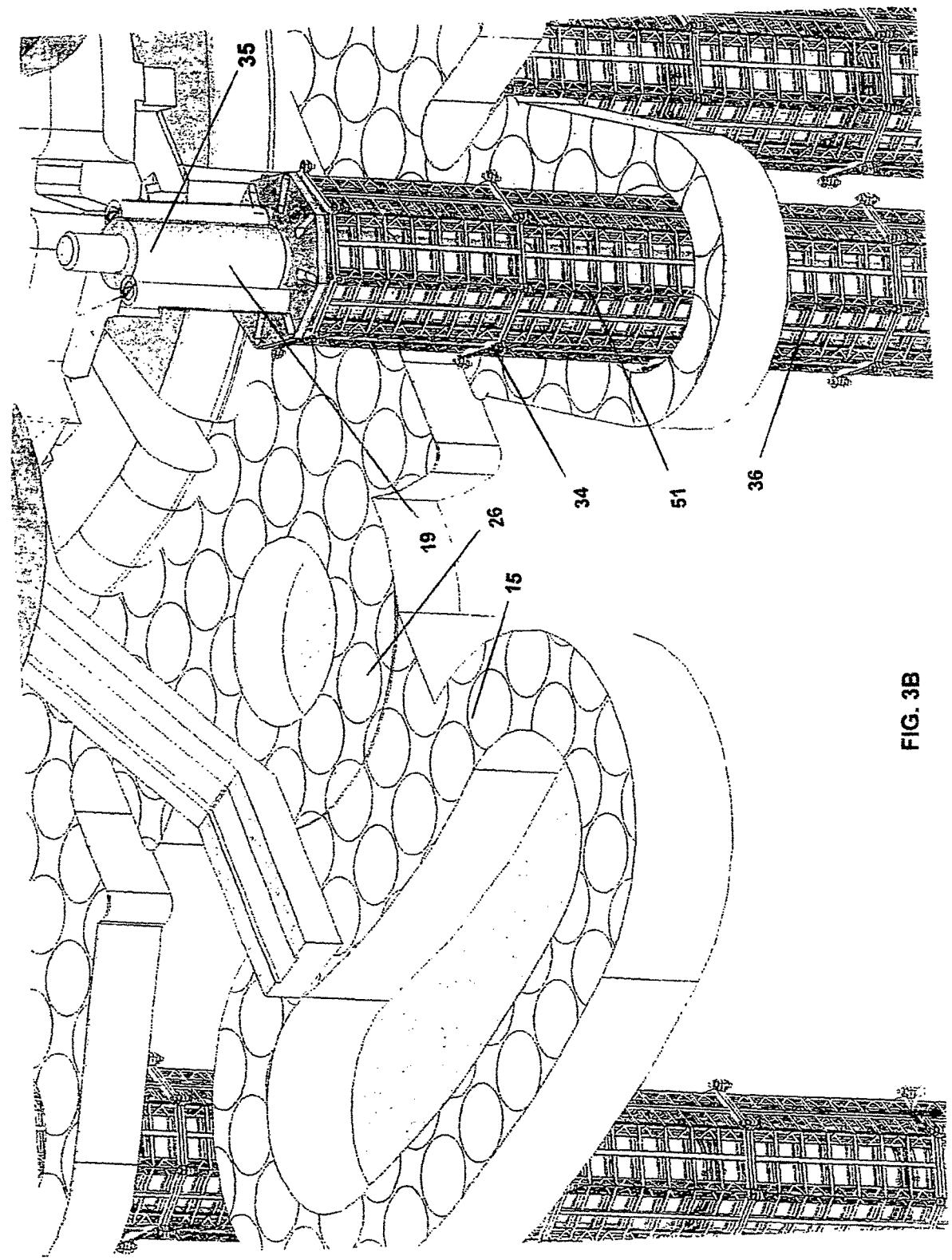
FIG. 3B presents a docking bay with a Plankton pool with a vehicle tower and a bay slide.
Figure 3C:
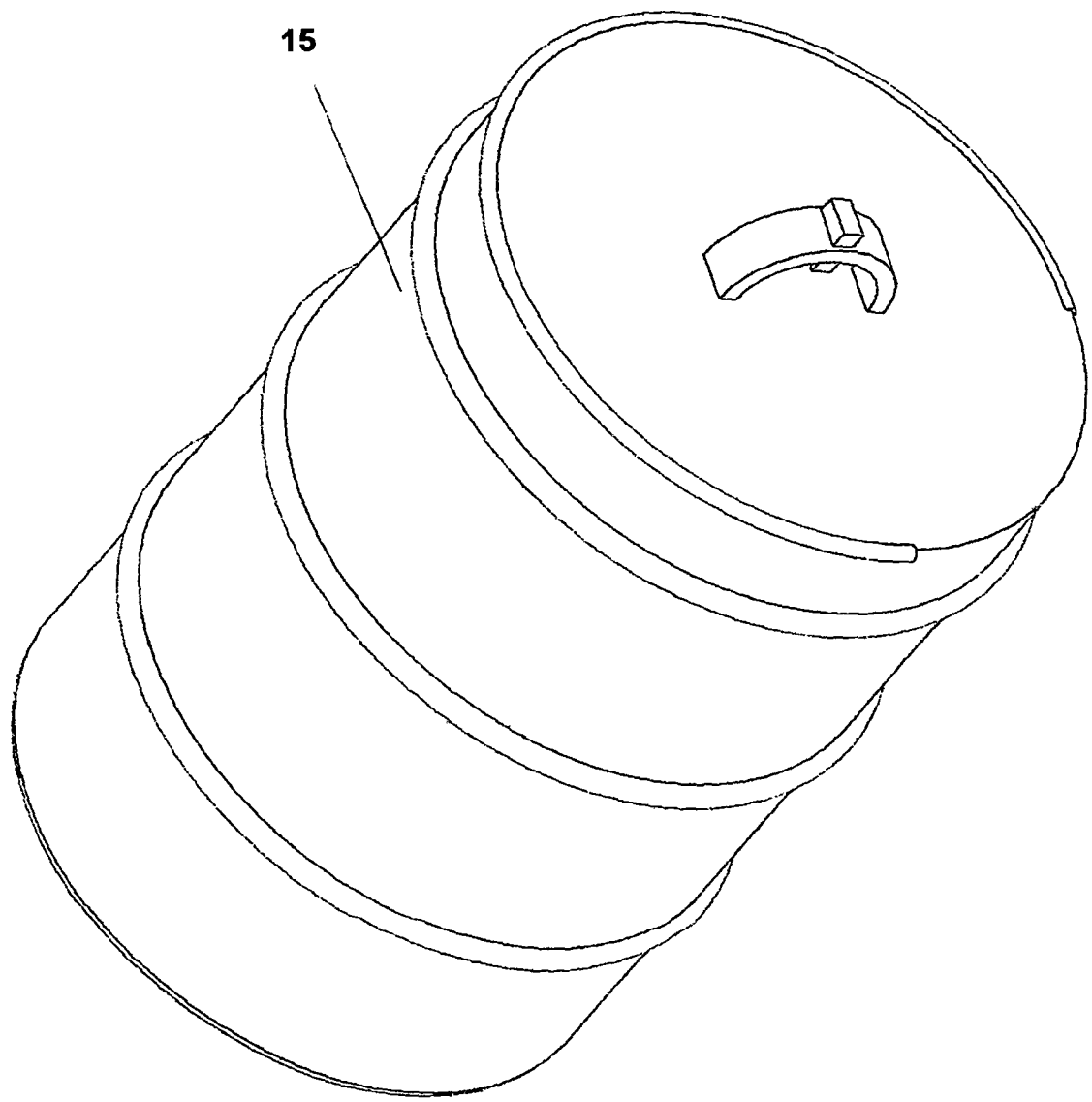
FIG. 3C presents a steel barrel.
Figure 4:
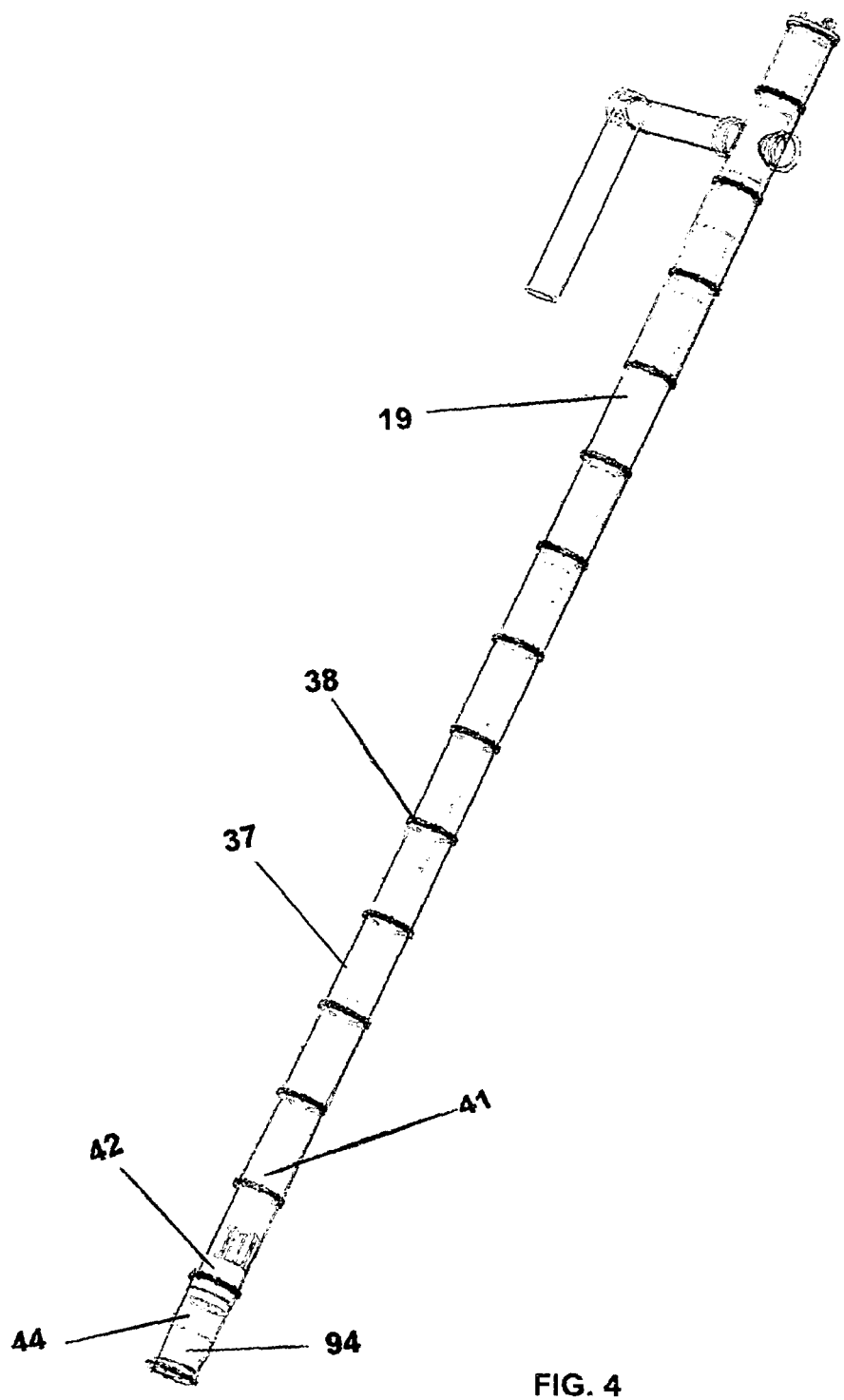
FIG. 4 presents a Plankton pumping tower with a telescopic actuator, multiple segment cylinder and a moving piston.
Figure 4A:
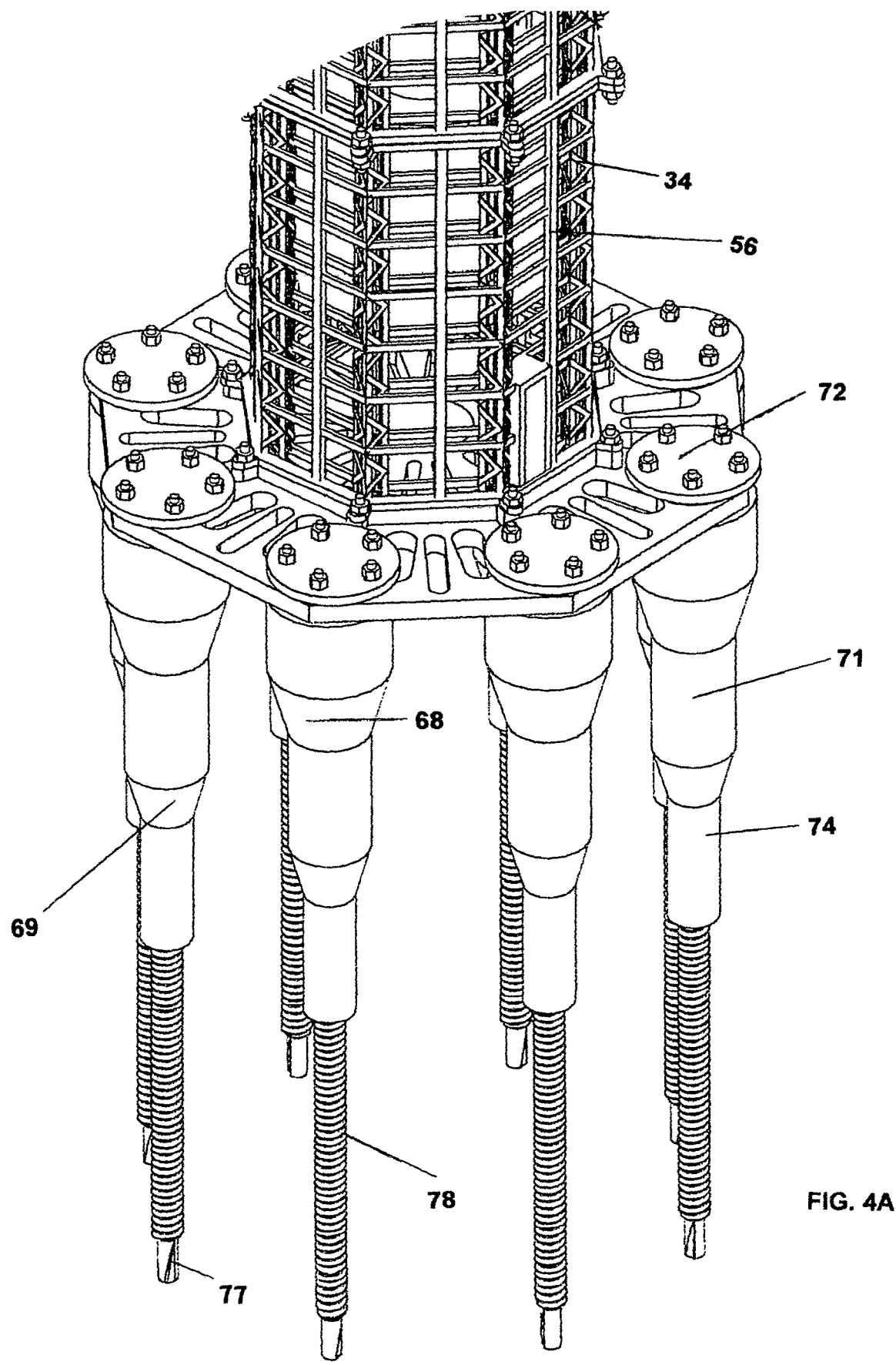
FIG. 4A presents a tower segment connected to cement poles and to self-drilling plungers
Figure 4B:
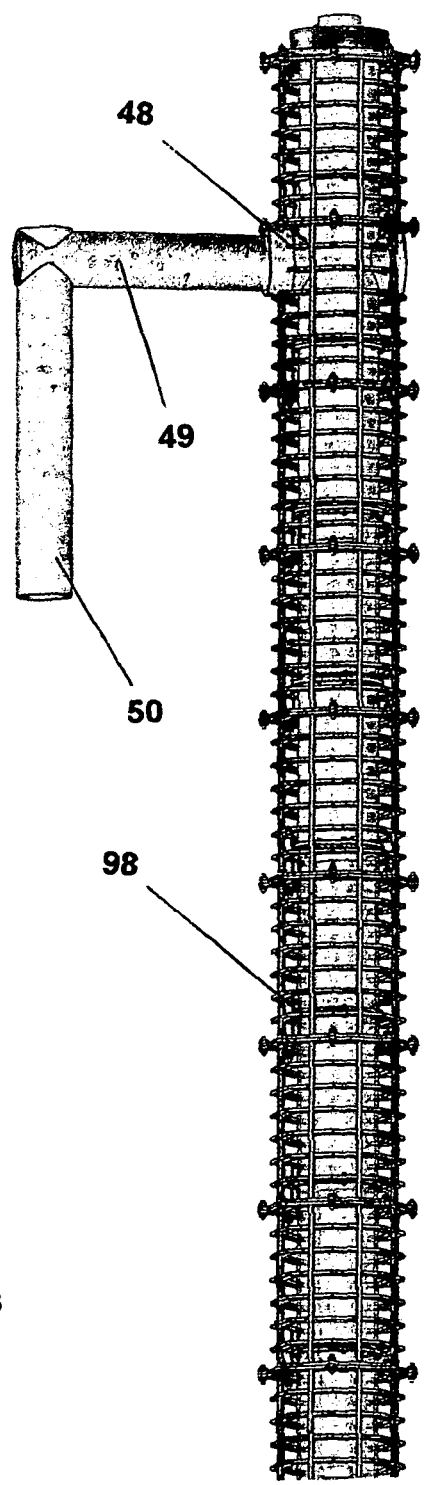
FIG. 4B presents a Plankton pumping tower with a T-fitting, a horizontal and vertical outlet pipes
Figure 5:
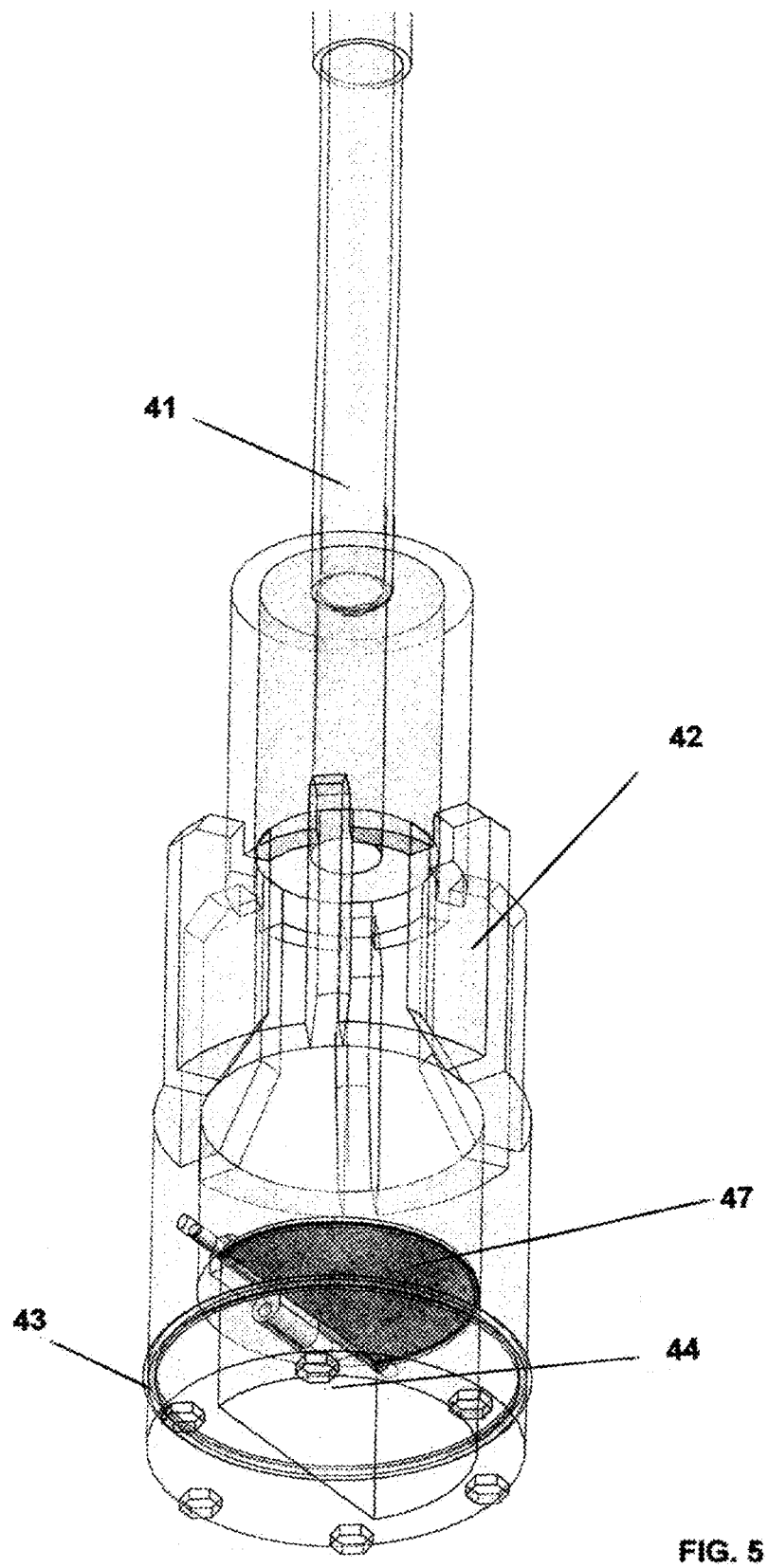
FIG. 5 presents a moving piston with a flow thru check valve
Figure 5A:
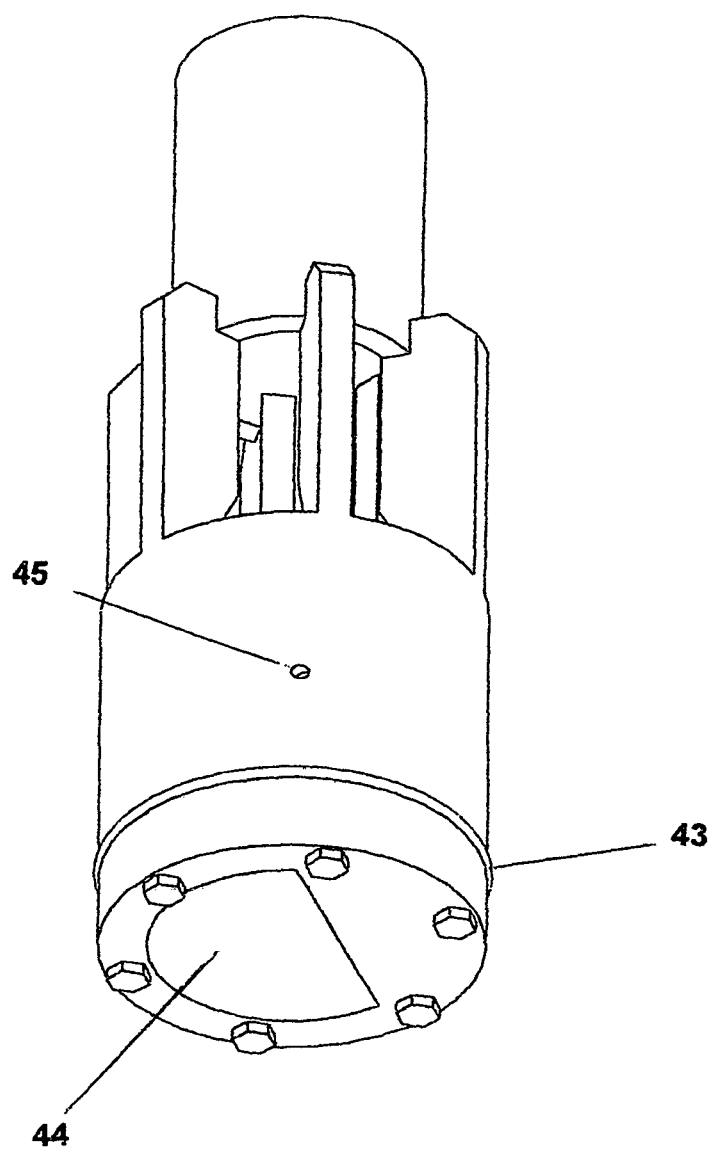
FIG. 5A presents moving piston
Figure 6:
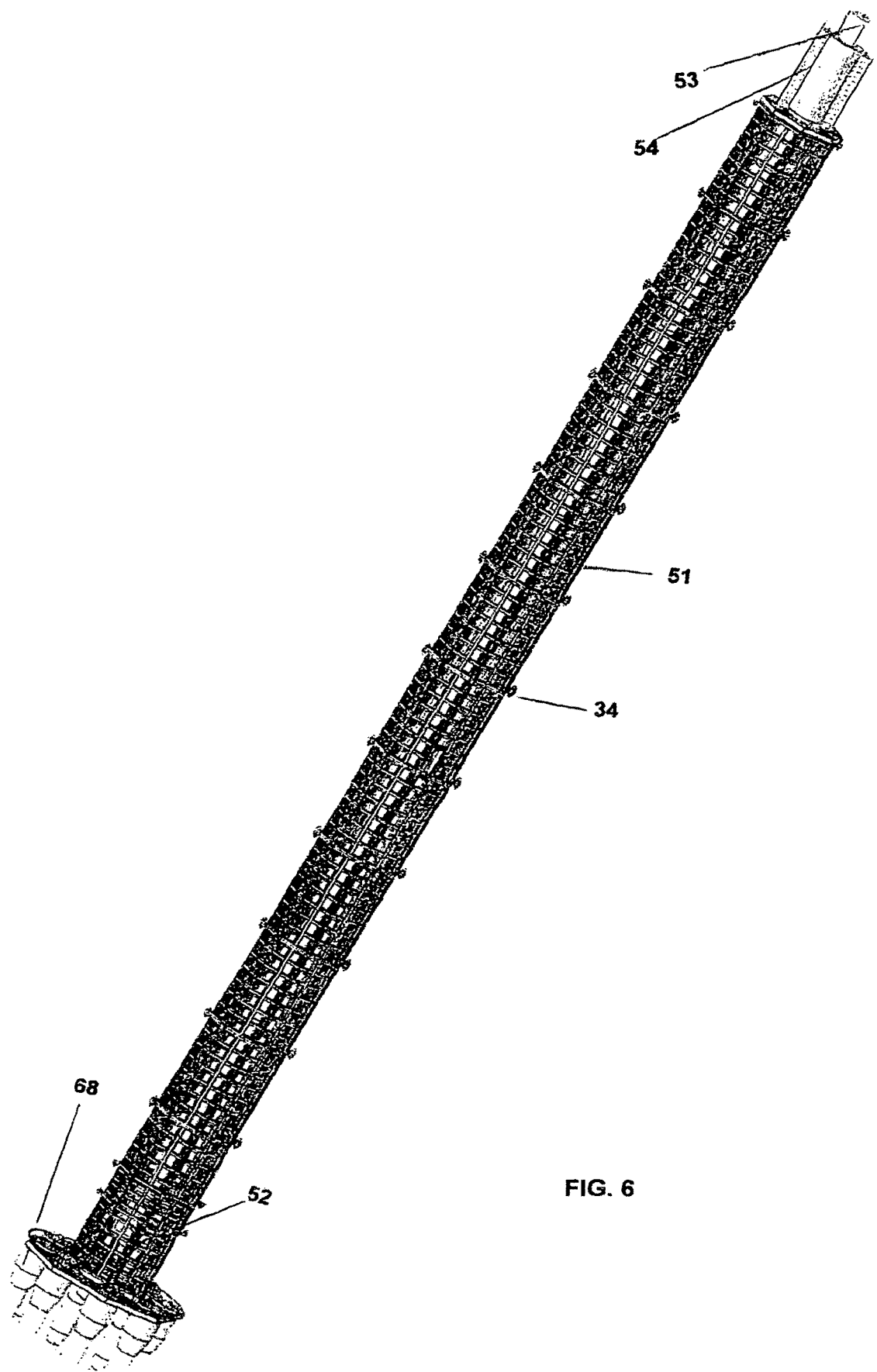
FIG. 6 presents a vehicle tower
Figure 6A:
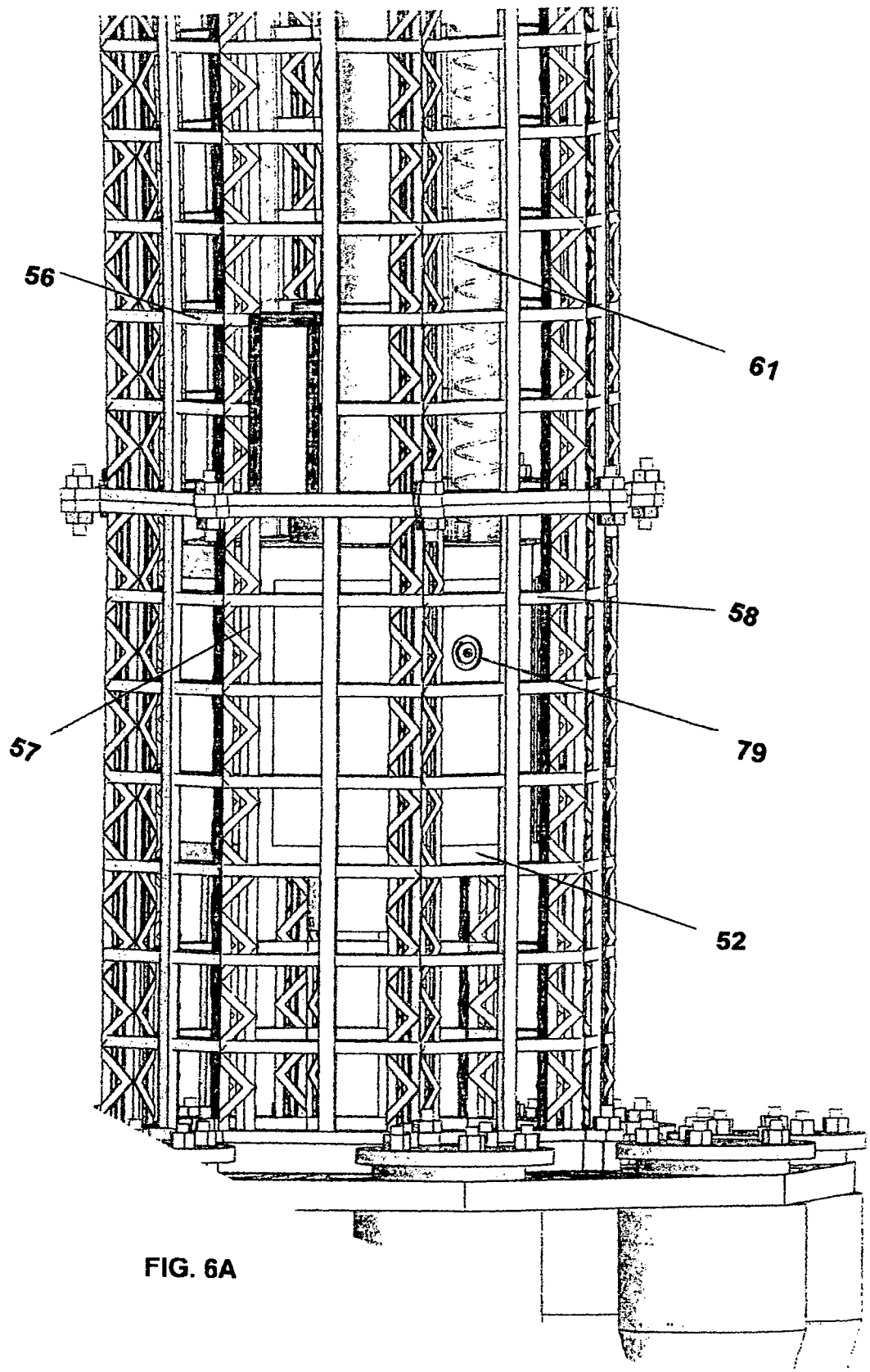
FIG. 6A presents a research vehicle and a vehicle tower at ocean floor
Figure 6B:
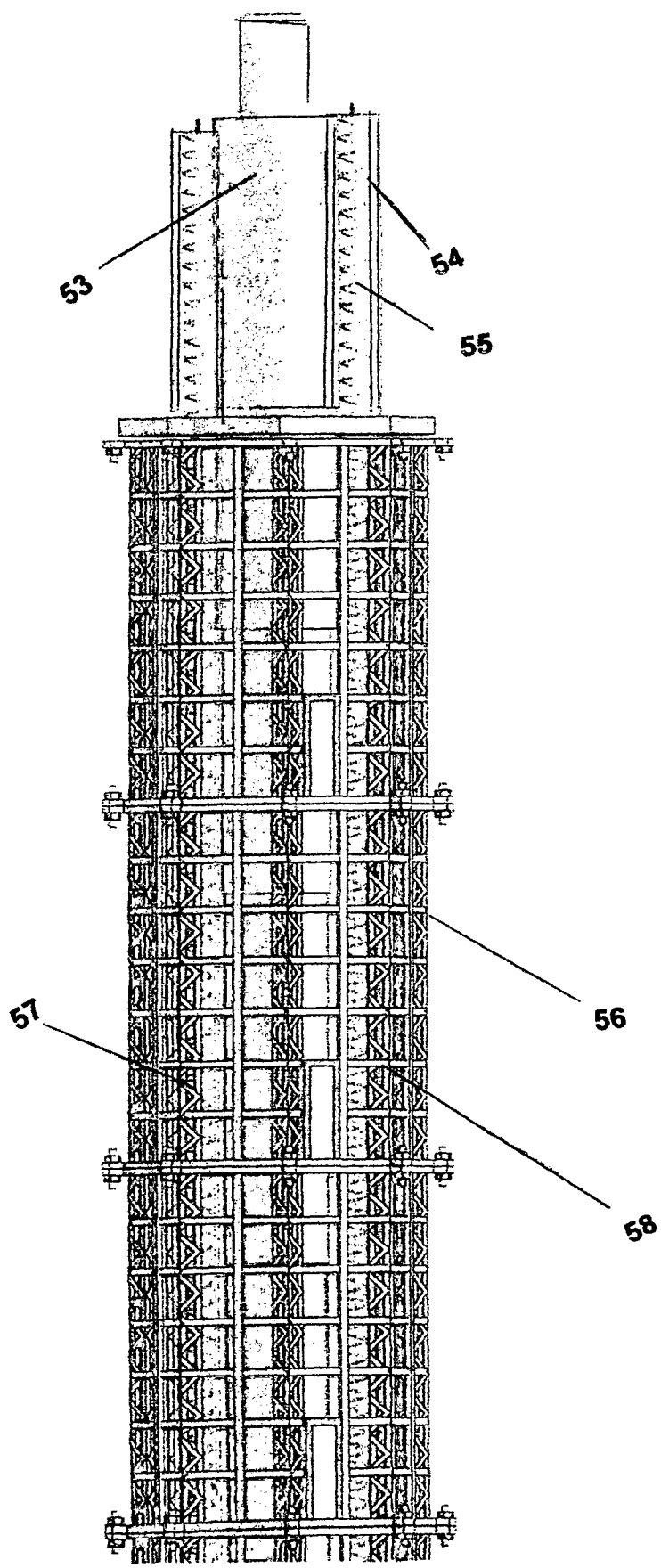
FIG. 6B presents topside vehicle tower segments with an actuator, and two telescopic air tubes with return springs
Figure 6C:
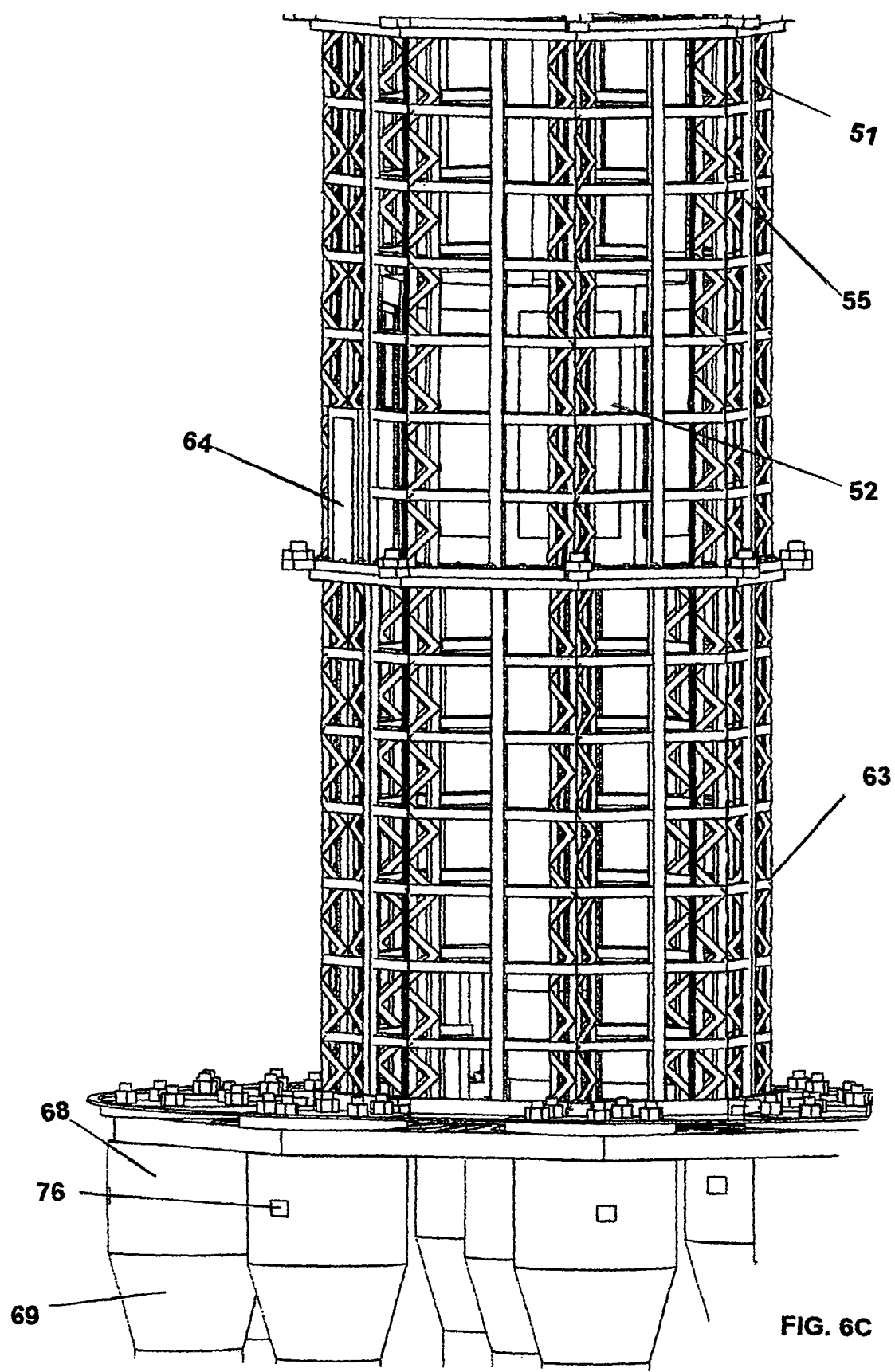
FIG. 6C presents a vehicle tower secured to seabed and a research vehicle
Figure 6D:
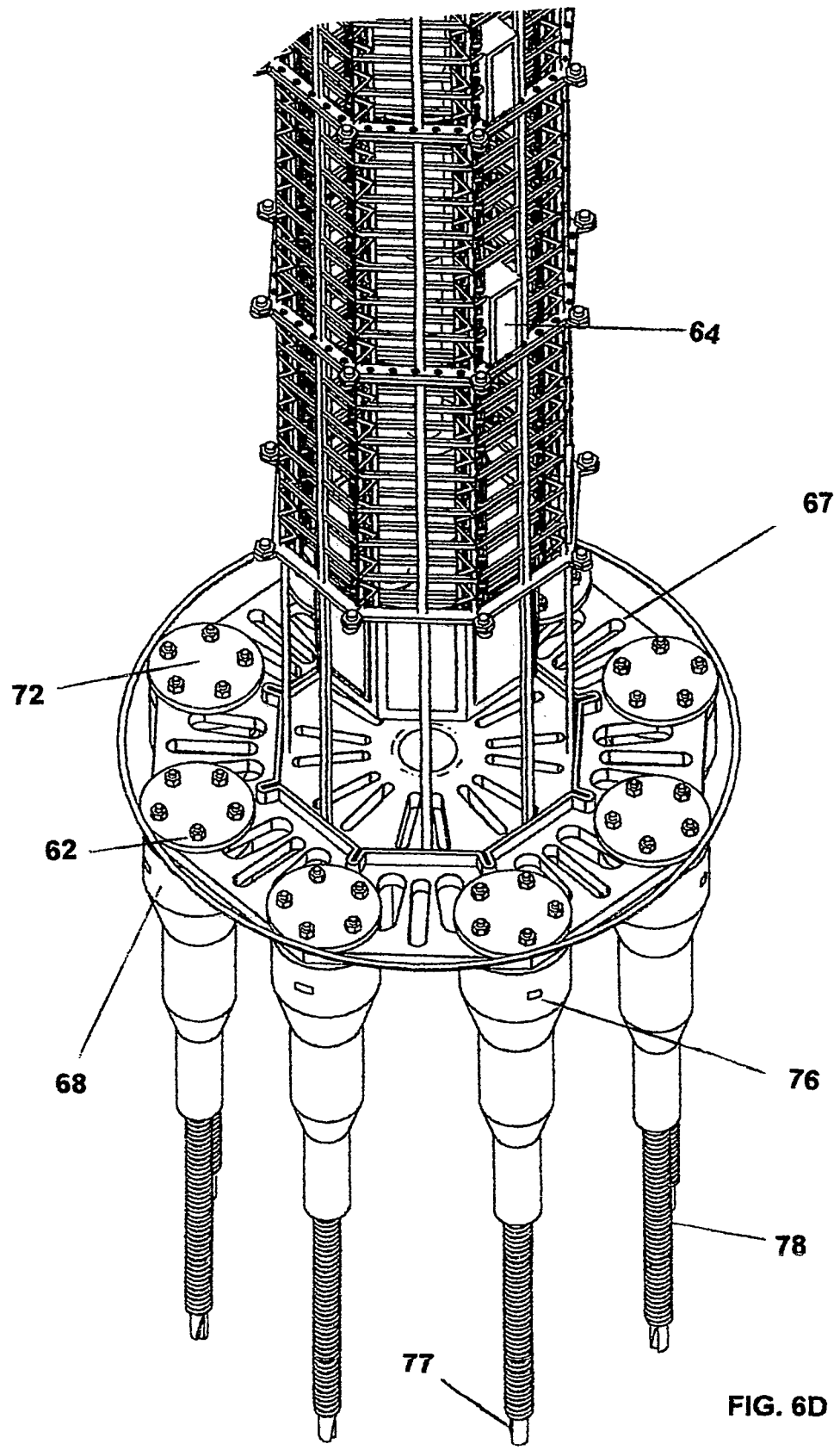
FIG. 6D presents a top view of a vehicle tower with seabed connection by cement poles and self-drilling plungers
Figure 7:
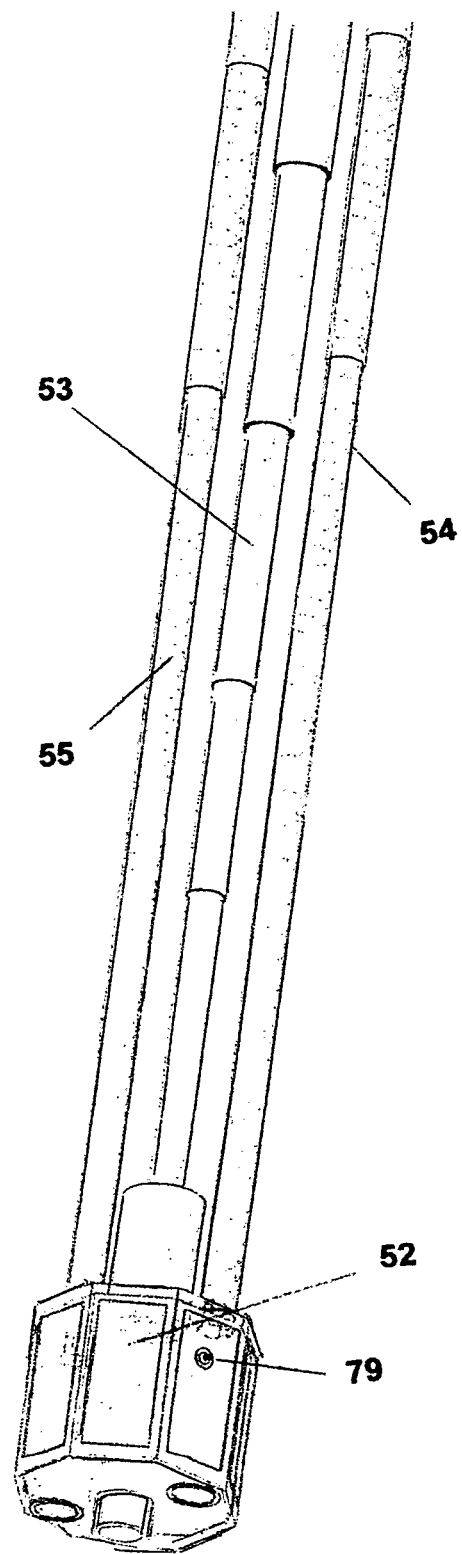
FIG. 7 presents a research vehicle with a double acting telescopic actuator, two air tubes and two return springs
Figure 7A:
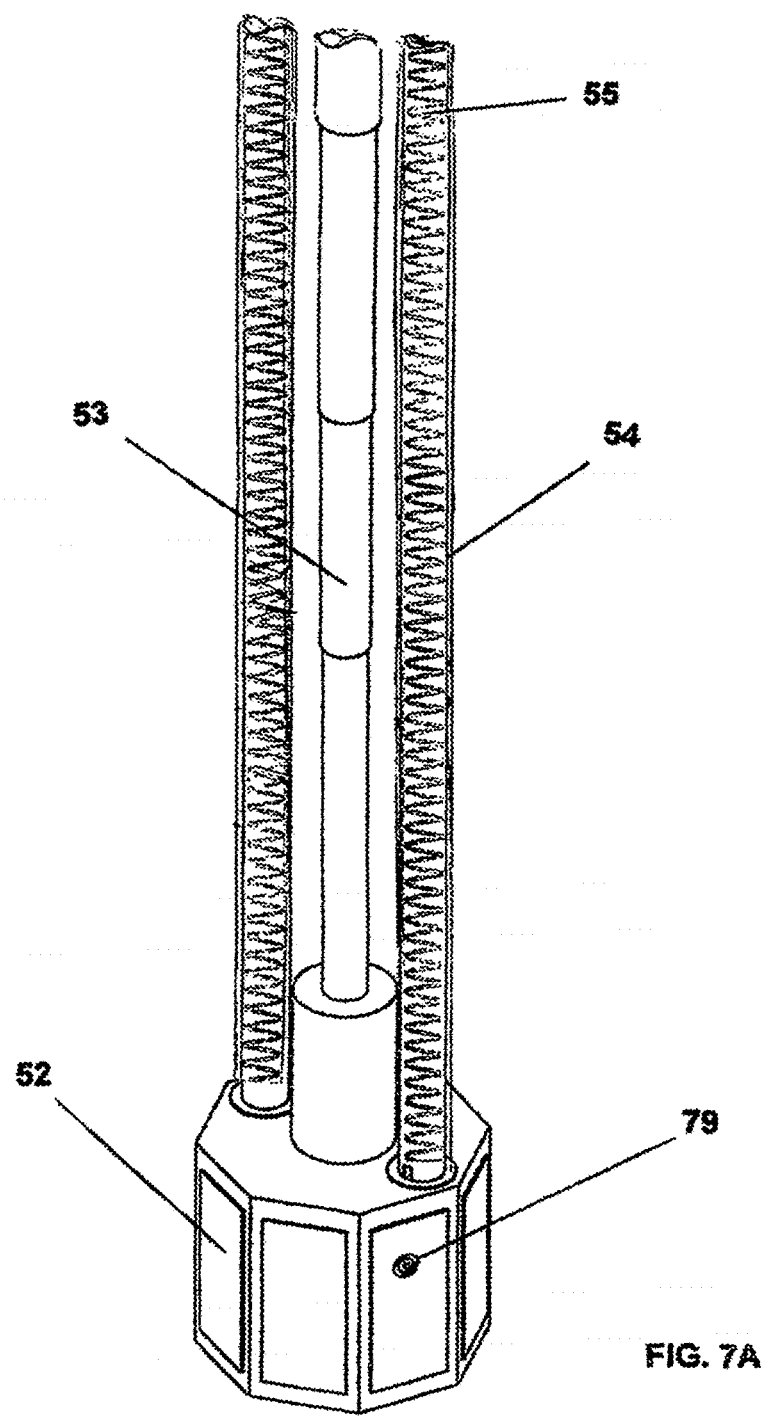
FIG. 7A presents a research vehicle, a double acting actuator with two helical return springs guided within two air tubes
Figure 8:
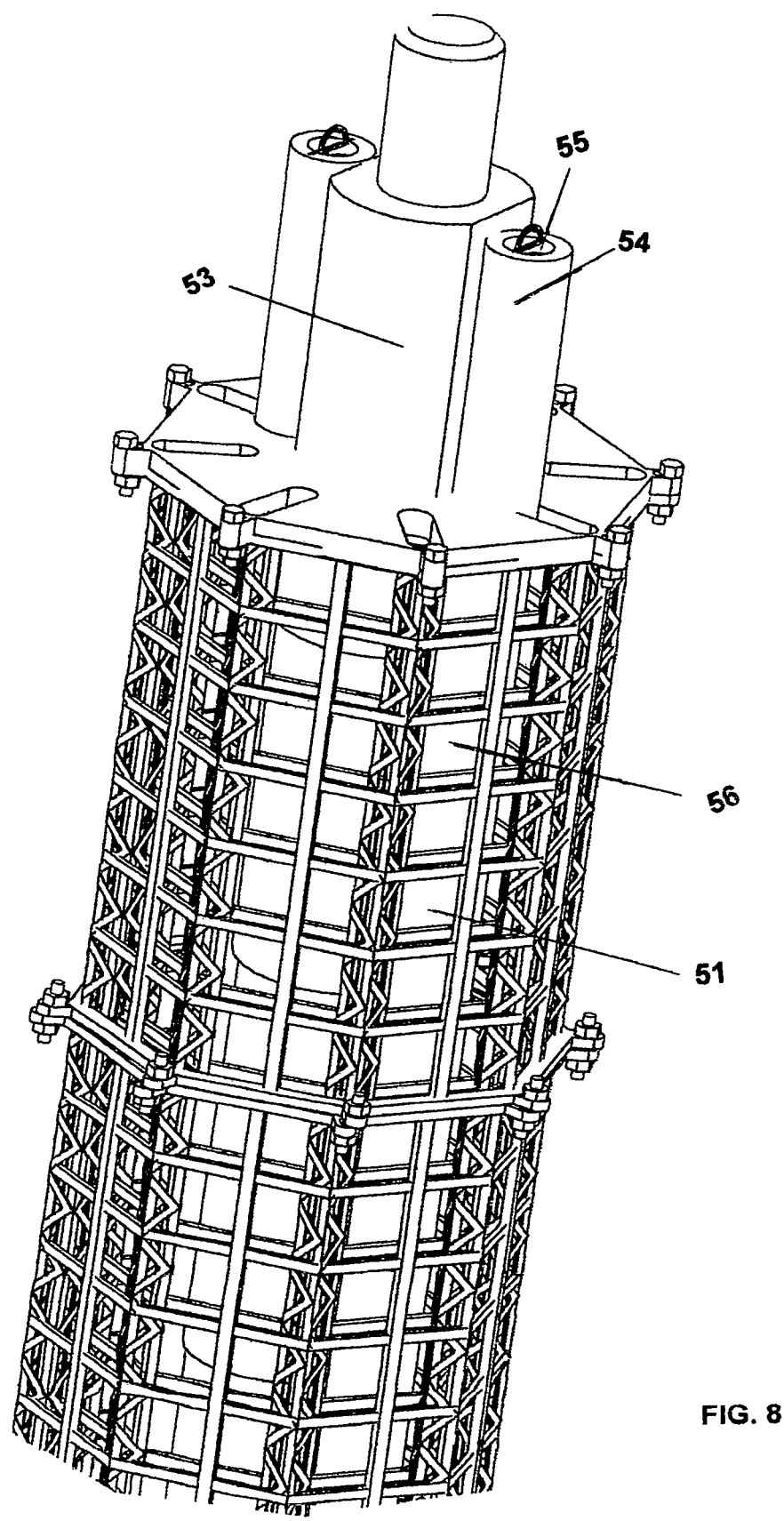
FIG. 8 presents a vehicle tower topside with two telescopic air tubes
Figure 8A:
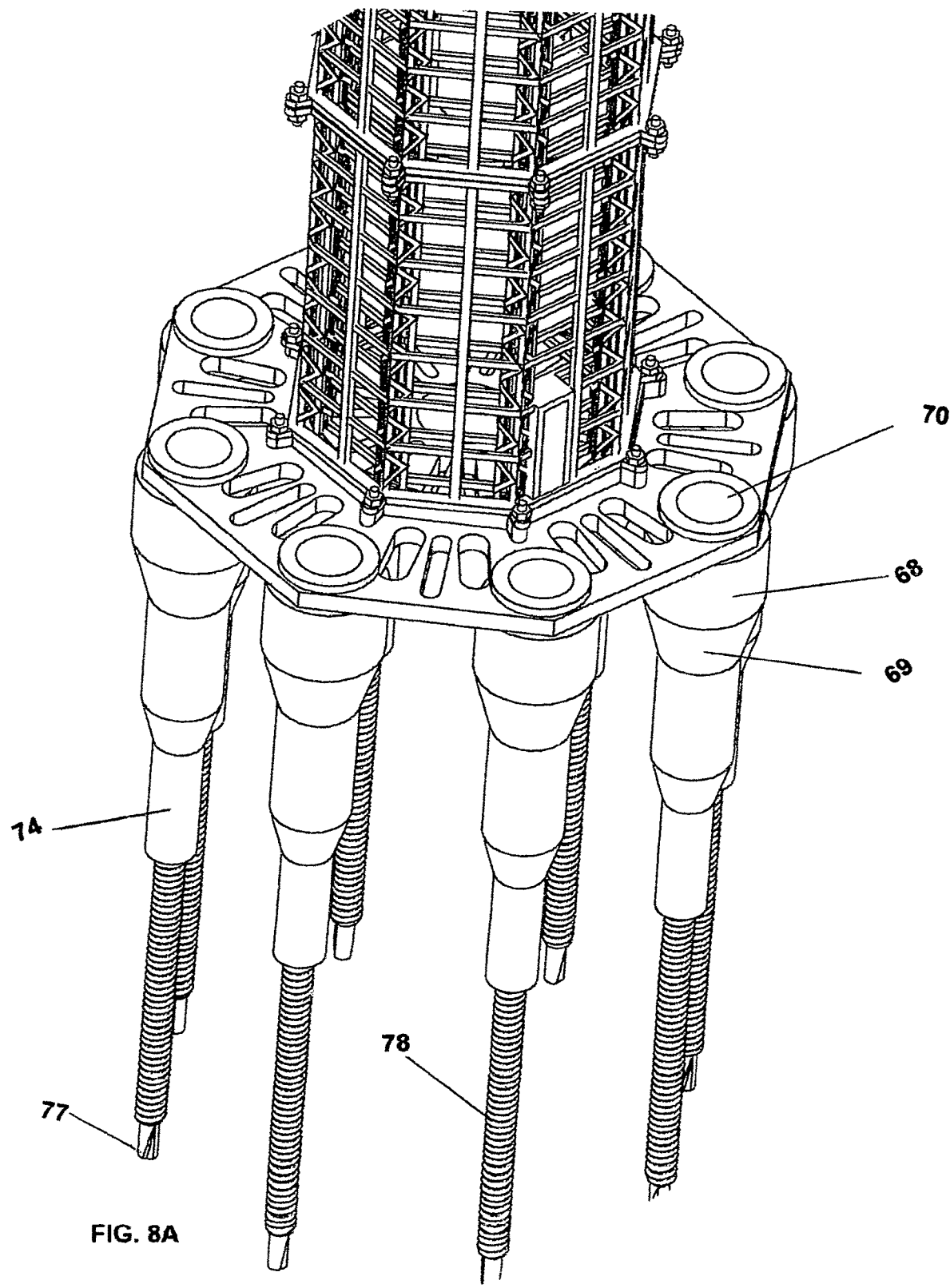
FIG. 8A presents tower connection to seabed with cement poles and self-drilling shanks with cylinder covers removed
Figure 9:
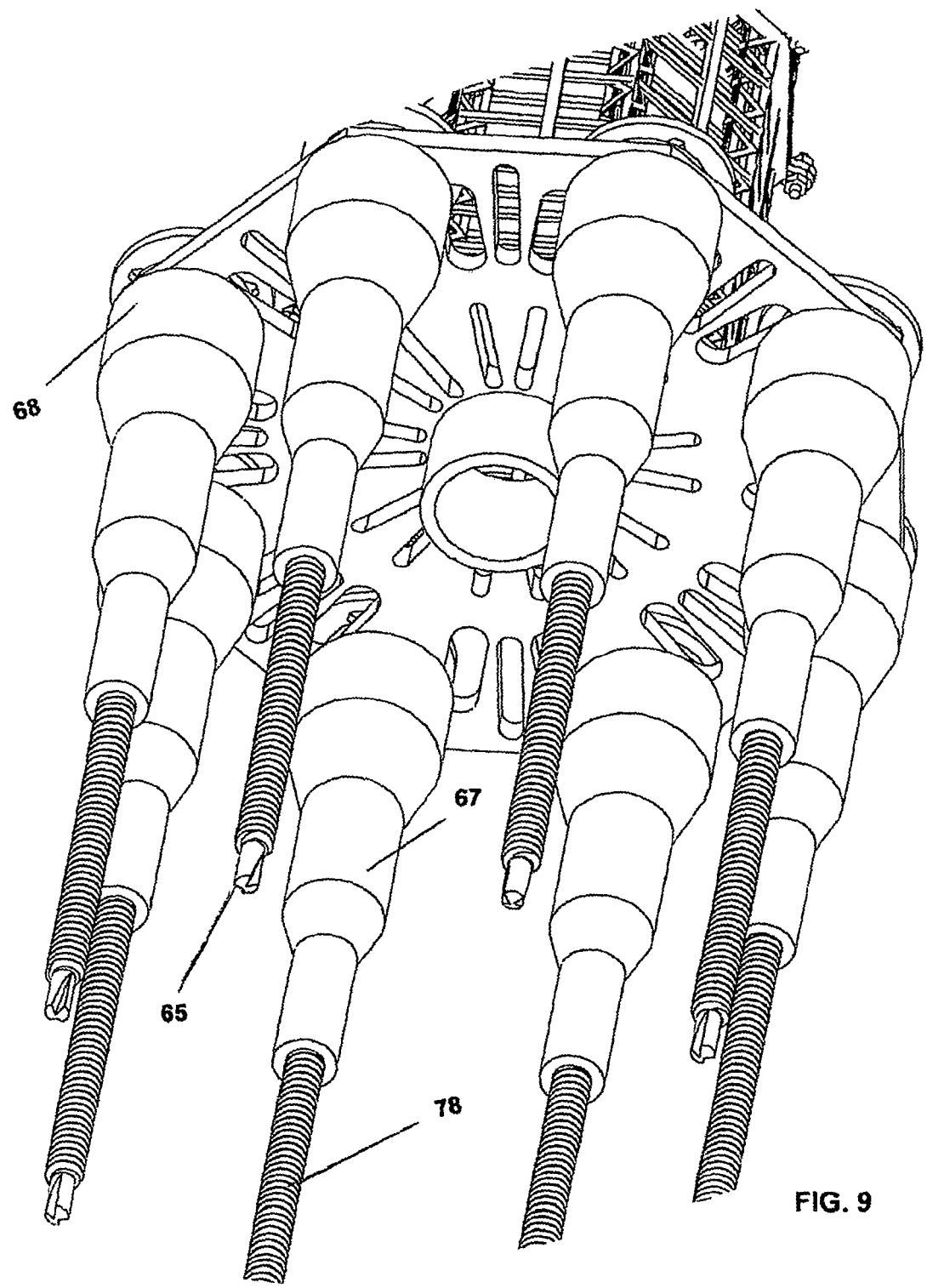
FIG. 9 presents a tower connected to seabed with multiple self-drilling plungers
Figure 9A:
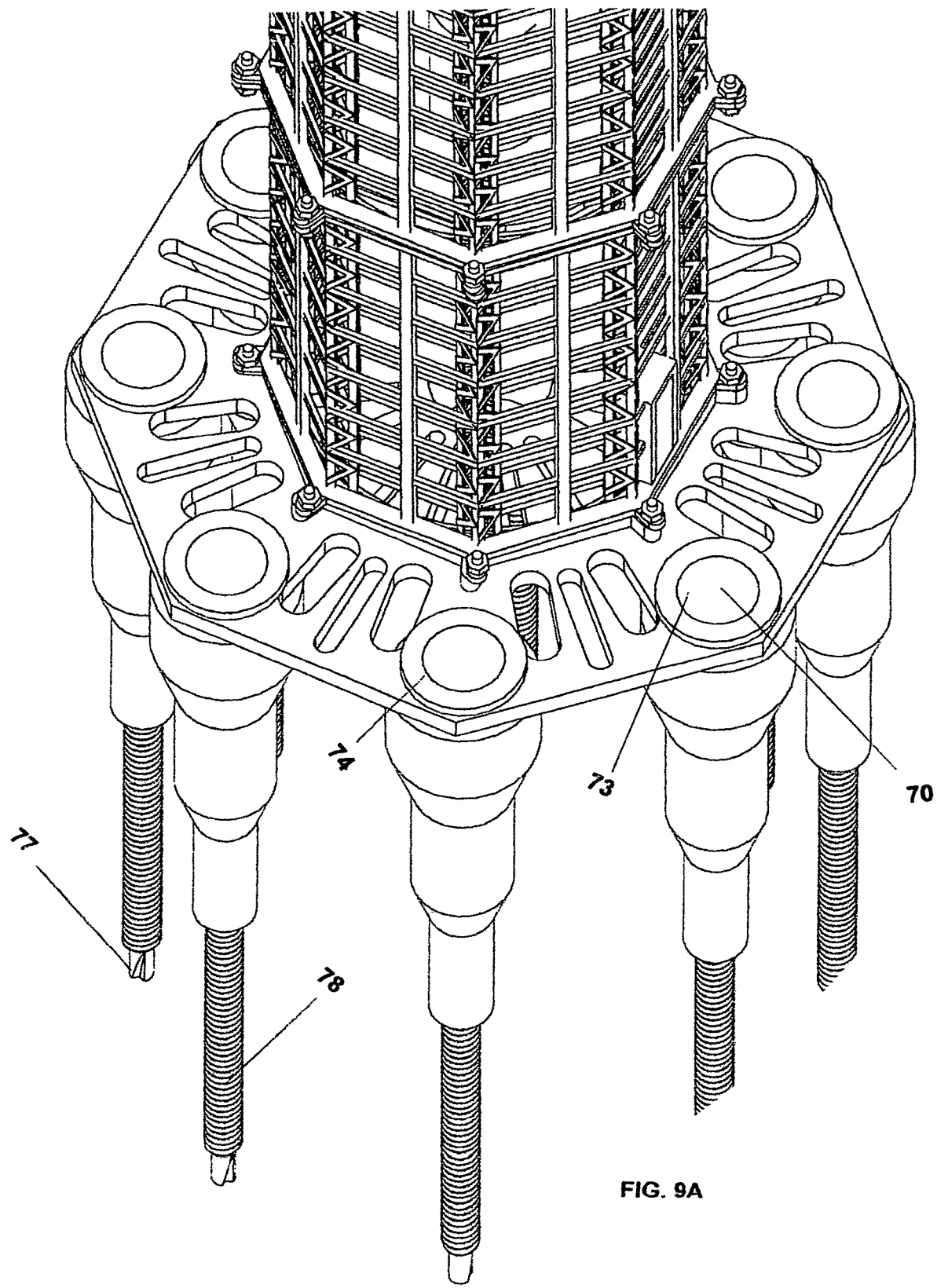
FIG. 9A presents tower connection to seabed with multiple self-drilling shanks with cylinder covers removed

| | |
|---|---|
| fishery | 11 FIG. 1A, 1B |
| ocean water | 12 FIG. 1C |
| docking bay | 13 FIG. 1 |
| steel barrel | 15 FIG. 2A, 3B, 3C |
| living premises | 16 FIG. 2A, 3 |
| laboratory | 17 FIG. 3, 3A |
| Plankton pumping tower | 18 FIG. 2A |
| telescopic double acting actuator | 19 FIG. 3B, 4 |
| water ballast | 26 FIG. 3, 3A, 3B |
| hull | 27 FIG. 2 |
| hull cavity | 28 FIG. 3A |
| Plankton pool | 31 FIG. 2 |
| fish pool | 32 FIG. 2 |
| tower bolted segment | 34 FIG. 3B, 4A, 4B, 6 |
| bracket vehicle tower actuator | 35 FIG. 7 |
| bay slide | 36 FIG. 3, 3B |
| cylinder bolted segment | 37 FIG. 4 |
| radial cylinder seal | 38 FIG. 4 |
| actuator-end connected to piston | 41 FIG. 4, 5 |
| piston, moving | 42 FIG. 4, 5 |
| piston with radial seal | 43 FIG. 5, 5A |
| piston flow thru hole | 44 FIG. 4, 5, 5A |
| check valve pivot disc pin | 45 FIG. 5A |
| pump check valve disc | 47 FIG. 5 |
| pump T-end fitting lateral outlet | 48 FIG. 2A, 4B |
| pump T-end fitting lateral pipe | 49 FIG. 2A, 4B |
| pump T-end fitting vertical-pipe | 50 FIG. 2A, 4B |
| Vehicle tower | 51 FIG. 3B, 6, 6C, 8 |
| manned research vehicle | 52 FIG. 1, 2B, 6, 6A, 6C, 7, 7A |
| double-acting telescopic vehicle actuator | 53 FIG. 6, 6B, 7A, 8 |
| air supply telescopic tubes to vehicle | 54 FIG. 6, 6B, 7, 7A, 8 |
| return extension type helical spring | 55 FIG. 6B, 6C, 7, 7A, 8 |
| tower segment | 56 FIG. 4A, 6A, 6B, 8 |
| tower section truss | 57 FIG. 3B, 6A, 6B |
| tower lateral beam | 58 FIG. 6A, 6B |
| vehicle top thru air holes | 61 FIG. 6A |
| cover embedded cylinder screws | 62 FIG. 6D |
| tower bottom-end segment | 63 FIG. 6C |
| vehicle glass windows | 64 FIG. 6C, 6D |
| Inlet pipe, pump | 65 FIG. 9 |
| cement pole adaptor | 67 FIG. 6D, 9 |
| cement molded cylindrical pole | 68 FIG. 4A, 6, 6C, 6D, 8A, 9 |
| cement -molded conical end | 69 FIG. 4A, 60, 8A |
| embedded cylinder | 70 FIG. 4A, 6, 6C, 8A |
| embedded cylinder small diameter bore | 71 FIG. 4A |
| cover, embedded cylinder | 72 FIG. 4A, 6D |
| topside embedded cylinder bore | 73 FIG. 9A |
| embedded Piston | 74 FIG. 4A, 8A, 9A |

LIST OF NUMERAL REFERENCES

Figure 2B:
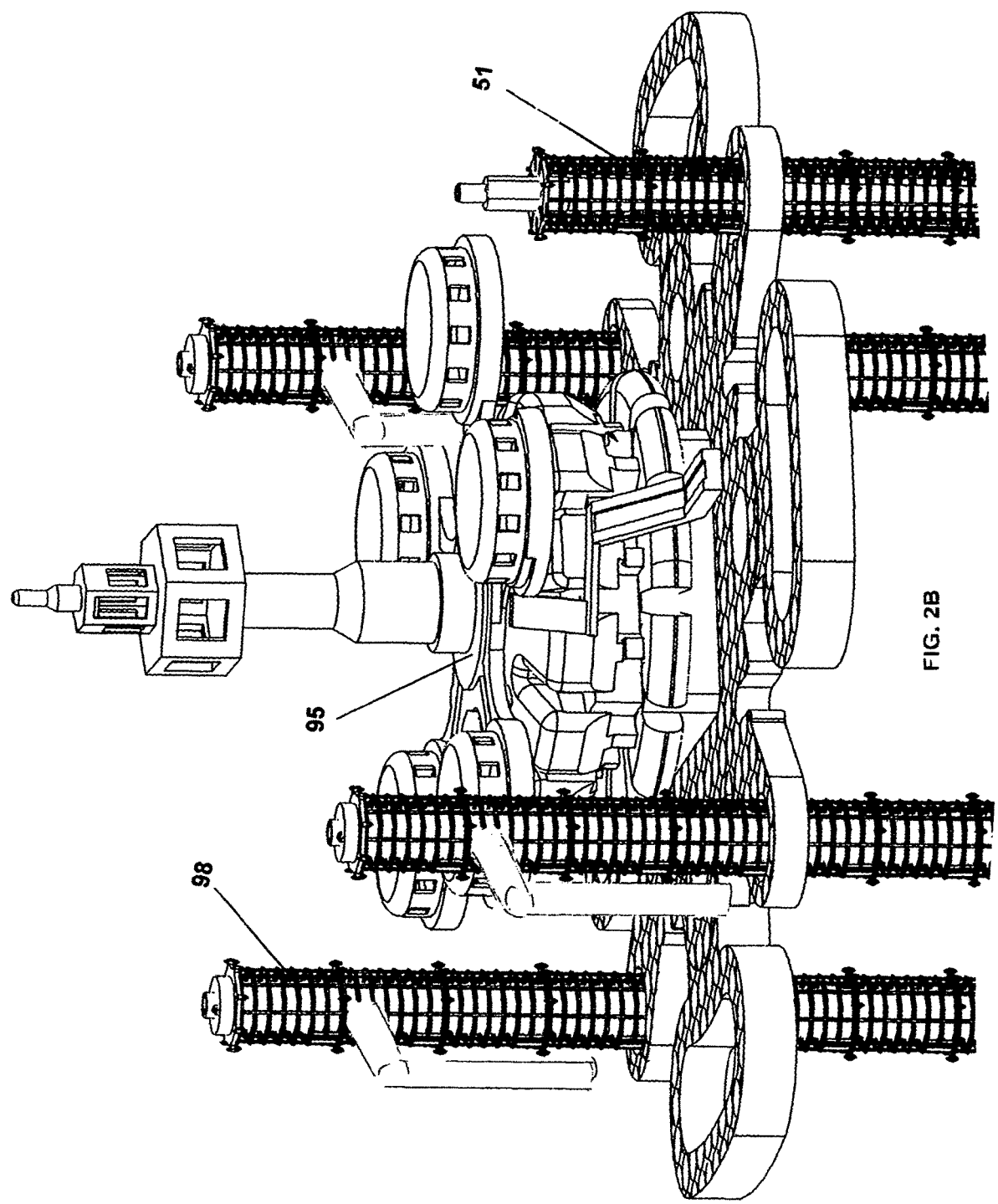
FIG. 2B presents a docking bay with an upper deck with living premises, laboratory, three Plankton pump towers and a vehicle tower
Figure 10:
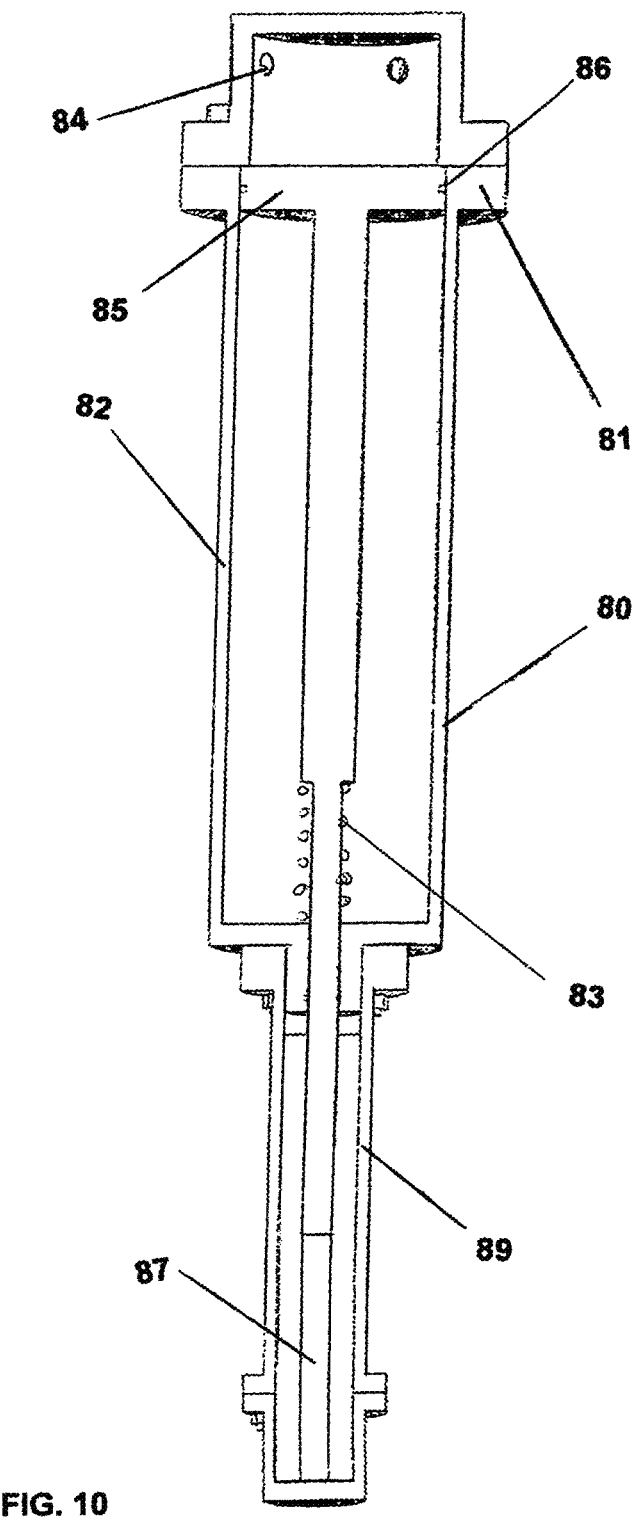
FIG. 10 presents cross sectional view of an ocean water depth gage

| | |
|---|---|
| holes in embedded cylinder | 76 FIG. 6D, 6D |
| plunger self-drilling end | 77 FIG. 4A, 6D, 8A, 9A |
| plunger Piston threaded shaft | 78 FIG. 4A, 6D, 8A, 9, 9A |
| video camera | 79 FIG. 6A, 7 |
| water depth gauge | 80 FIG. 10 |
| water depth gauge cylinder | 81 FIG. 10 |
| water depth gauge cylinder bore | 82 FIG. 10 |
| water depth gauge helical spring | 83 FIG. 10 |
| water depth gauge cylinder radial hole | 84 FIG. 10 |
| water depth gauge piston | 85 FIG. 10 |
| water depth gauge piston shaft | 86 FIG. 10 |
| water depth gauge LVDT center core | 87 FIG. 10 |
| Water depth gauge LVDT housing transformer assembly | 88 FIG. 10 |
| center island bay | 92 FIG. 1A |
| control tower | 93 FIG. 3 |
| bottom check valve | 94 FIG. 4 |
| upper deck | 95 FIG. 2A, 2B, 3, 3A, 3B |
| top bracket | 96 FIG. 4 |
| platform | 97 FIG. 1, 1A, 1B, 1C |
| Plankton pump tower | 98 FIG. 1, 4B |
| seabed dirt | 99 FIG. 1, 1C, 2B |

DETAIL DESCRIPTION OF THE INVENTION

FIG. 1 presents an offshore floating platform 97 with living premises 16, a laboratory 17, Plankton pools 31, three Plankton pumping towers 18 and a vehicle tower 51.

A floating fishery 11 with multiple large ring-tubes, a large docking bay 13 for boats with multiple Plankton pools 31. An upper deck 95 is built above hull constructed of multiple layers of high buoyancy barrels welded to each other, including living premises 16 with a laboratory 17. Three Plankton pumping towers 18 and a research vehicle tower 51 equipped with a telescopic double acting actuator 53, and two air telescopic tubes 54 with two return springs 55 connecting to a submersible vehicle 52 moving down from above ocean water level and reaching down to ocean floor up to 120' depth. FIG. 1A presents four offshore floating platforms 97 with a fishery 11 and a center island bay 92

FIG. 1B presents detailed view of an offshore floating platform 97 with an upper deck, with three Plankton pumping towers 18 and one vehicle tower 51 secured to seabed dirt 99 and a fishery 11.

FIG. 1C presents an offshore floating platform 97 with ocean water 12 and seabed dirt 99 showing three Plankton pumping towers 18 and a vehicle tower 51 extending from above water level and secured to seabed dirt 99 at the ocean floor.

FIG. 2 presents a docking bay 13 with a hull 15 at its center. Hundreds of steel sealed and empty barrels are arranged in multiple layers one on top of the other and welded together with supporting brackets. The docking bay and hull provide the buoyancy force for upper deck with living premises, laboratory and control tower.

FIG. 2A presents an offshore floating platform 97 with living premises 16, a laboratory 17, multiple Plankton pools 31, three Plankton pumping towers 18, a vehicle tower 51 and a control tower 93.

FIG. 2B presents a docking bay 13 with an upper deck 95 with living premises 16, laboratory 17, three Plankton pump towers 18 and a vehicle tower 51

FIG. 3 presents an upper deck 95 with living premises 16, a control tower 93 and a bay slide 36.

Ocean water ballast 26 within multiple barrels of the hull 27 thereby ballast added internal water weight controlling the floating height above water level of said docking bay 3 in ocean water.

FIG. 3A presents an upper deck 95 viewed from below with living premises 16 and a control tower 93. A laboratory 17 and multiple living premises 16 mounted above upper deck 95 over hull 27 multiple-barrel layers and said docking bay 13, whereby said living premises with glass windows 32 and food storage containers provide for long-term accommodation for researchers. The laboratory 17 provide means to analyze ocean deep water research data continuously including pH, water temperature, chemical analysis, and biological analysis of plankton pumped from research submersible vehicle from ocean floor. Video screens are presenting continuous video cameras' output recorded from the submersible manned and aerated vehicle 52 camera 79 attached to glass windows 64 internally.

FIG. 3B presents a docking bay 13 with a Plankton pool 31 with a vehicle tower 51 and a bay slide 36. FIG. 3C presents a steel barrel.

FIG. 3C presents a steel barrel 15 which is sealed and empty to maximize buoyancy. Hundreds of barrels in vertical position are welded together and organized in layers one on top of the other to provide strong reliable buoyancy to the platform 97. Some of the barrels are filled with ocean water as ballast for the stability of the floating unit.

FIG. 4 presents a Plankton pumping tower 18 with a telescopic double acting telescopic actuator 53, multiple cylinder segment 37 and a moving piston 42. The submersible Plankton pumping tower 18 extending from above ocean water level to ocean floor up to 120 feet depth constructed with multiple tower segments 34 bolted to each other, each segment consists of beam truss sections 57 structured together with lateral steel beams 58, wherein the tower extended and secured to ocean floor seabed dirt 99 up to 120 feet water depth, inserted through hole in docking bay 13 and attached above water level to barrel bay with cables, thereby constructing stable construction tower submerged in ocean water. Multiple cylinder segments 34 bolted to each other with radial resilient seals 38 between them, thereby creating high pressure boundary long submersible cylinder extending from above sea water level up to 120 feet water depth.

Double-acting telescopic actuator 53 firmly attached to the top center bracket 96 of the Plankton pumping tower 18 extending from above water level down to 120 feet deep with actuator end 41 bolted to a moving piston 42 within said cylinder 37, thereby said actuator is moving piston with radial seal 43 engaging said cylinder and creating pressure boundary.

FIG. 4A presents a tower segment 56 connected to cement poles 68 and to self-drilling plungers 77. Cement cylindrical poles 68, with embedded metallic cylinder 70 and sliding embedded piston 74 are covered with bolted covers 72.

FIG. 4B presents a Plankton pumping tower 18, with a T-fitting 48, a horizontal pipe 49 and vertical outlet pipe 50.

FIG. 5 presents a moving piston 42 with a flow thru check valve disc 47. The moving piston has through hole 44 for large Plankton and water flow with check valve disc 47 with lateral pivot disc pin that swings open when piston 42 moved downwards, thereby ocean water with plankton flow upwards thru check valve thru hole 44 from ocean floor upwards through the cylinder bolted segments 37 to outlet vertical pipe 50 flowing to Plankton pools 31.

A bottom check valve 94 with bolted flange to the cylinder lower segment 37 with large thru flow hole and check valve with disc 47 that swings open allowing water and plankton flowing from the ocean floor up when said piston 42 moves upwards thereby filling said cylinder tube 37 with water and plankton under piston 42 when piston moves up wherein water continue flowing up through piston to outlet vertical pipe 50 when piston moves down.

A T-end fitting with lateral outlet 48 connected to lateral pipe 49 which has T-fitting connected to a vertical pipe 50, thereby water with plankton flow is directed from multiple cylinder segments out into Plankton pools 31

FIG. 5A presents a moving piston 42.

FIG. 6 presents a vehicle tower 51 extending from above water level and down to sea floor at 120 feet depth with cemented cylindrical poles 68 and metallic embedded cylinders 70 and self-drilling plungers 76 penetrating into the seabed dirt 99 in helical thread-in motion under high water pressure acting on embedded piston 74 topside.

FIG. 6A presents a manned and aerated research vehicle 52 and a submersible vehicle tower 51 at ocean floor.

A submersible vehicle tower 51 with submersible aerated and manned research vehicle 52 moving from water level to ocean floor up to 120 feet deep by submersible double-acting telescopic actuator 53 and aerated with two telescopic air tubes supplying air at atmospheric pressure from air blower located above water level through two holes in vehicle top. Two helical extension type return helical springs 55 guided within the telescopic air tubes connected to vehicle 52 top on lower side and to vehicle tower topside bracket assures vehicle going up to above water level in case of actuator malfunction. A long submersible vehicle tower 51 extending from above ocean water level to ocean floor up to 120 feet depth constructed with multiple tower segments 56 bolted to each other, each segment consists of beam truss sections 57 structured together with lateral steel beams 58, thereby said tower secured to ocean floor seabed and also pass through hole in docking bay 13 and attached to the docking bay with cables 59 above water level, thereby constructing stable construction tower submerged in ocean water.

FIG. 6B presents vehicle tower 51 segments 56 with a double acting telescopic actuator 53, and two telescopic air tubes 54 with two helical return springs 55

FIG. 6C presents a vehicle tower 51 secured to seabed dirt 99 and a research manned and aerated vehicle 52.

FIG. 6D presents a top view of a vehicle tower 51 with seabed dirt 99 connection by cement poles 68 and self-drilling plungers 76

FIG. 7 presents a research manned and aerated vehicle 52 with a double acting telescopic actuator 53, two air tubes 54 and two helical return springs 55.

The submersible double-acting telescopic high pressure actuator 53 firmly attached to the top bracket 35 of said construction tower extending from above water level to 120 feet deep with actuator end securely connected to the top of a moving submersible manned aerated vehicle 52, FIG. 7A presents a manned and aerated research vehicle 52, a double acting actuator 53 with two helical return springs 55 guided within two air tubes 54 inner diameter FIG. 8 presents a vehicle tower 51 with two telescopic air tubes 54

The submersible manned and aerated research vehicle 52 has two top thru air holes 61 for continuous aeration at atmospheric pressure from above water level air blower through telescopic air tubes 54 Each of the air tubes inner diameter is guiding a safety return to above water level by extension helical spring 55, thereby said submersible vehicle is aerated continuously from above water and all the way to ocean floor at 120 feet deep under continuous atmospheric pressure, and either one of two springs provides fail-safe return to above water in case of actuator failure.

FIG. 8A presents a tower connection to seabed dirt 99 with cement poles 68 and self-drilling shanks 76 with cylinder covers 72 removed. including metallic embedded cylinders 70 with embedded pistons 74 with top sealing covers 72 for the embedded cylinders and with self-drilling shanks 77 pushed into the seabed dirt 99 in thread-in helical motion under high ocean water pressure above said sliding embedded pistons top with water connection thru holes 76 in embedded cylinders 70 topside.

FIG. 9 presents a tower bottom end segment 63 secured to seabed dirt 99 with multiple self-drilling plungers 77. Tower bottom-end segment 63 securing to seabed dirt 99 comprising multiple self-drilling plunger 77 powered by high ocean water pressure in topside of embedded cylinder 74 connected thru holes 76 acting on top of embedded cylinder thereby pushing embedded piston 74 with threaded piston shaft 78 downward into and seabed dirt 99 in helical thread-in motion. Heavy cement-molded large diameter cylindrical cement poles 68 with conical downward end 69. Embedded metallic cylinders 66 with large diameter and long bore with smooth surface on top side, with radial thru holes 76 into said bore on the topside, with cylinder top bolted covers 72 and with concentric smaller diameter cylinder bore 71 threaded with high pitch threaded multiple video cameras 79 attached internally to the glass windows 64 of the submersible manned and aerated research vehicle 52 continuously recording views Plankton of fish and seafood swimming around the vehicle, providing continuous video picture to TV screens in said living premises 16.

FIG. 9A presents a bottom-end tower segment 63 attachment to seabed dirt 99 with multiple self-drilling shanks 77 with cylinder covers 72 removed FIG. 10 presents cross sectional view of an ocean water depth gage. Water depth gage 80 attached to said submersible vehicle 52 comprising: A water depth gage cylinder 81 with smoothly machined cylinder bore 82 and equipped with thru radial holes 83 located on topside of cylinder 81 thereby allowing ocean high pressure water into said cylinder. A water depth gage piston 84 sliding within said cylinder having radical groove with resilient seal 85 on piston upper side, thereby sealing high water pressure between cylinder and piston top and with return gage helical spring 83 guided around the piston shaft 86 opposing said water pressure force. When the vehicle 52 moves down toward ocean floor, external ocean pressure increases linearly with the depth of the vehicle, thus applying larger force on gage piston 84 that travels downwards deflecting the helical spring until the pressure force equals the spring opposing force. Submersible Variable Differential Transformer (LVDT) center core 87 firmly attached to piston shaft 86, and LVDT housing transformer assembly 88 attached to said cylinder 81 bottom side 89 thereby when piston moves relative to cylinder, LVDT output changes and recorded in premise laboratory, thereby LVDT output is linear with water depth of submersible manned and aerated research vehicle 52 location and it provides accurate measurement of its water depth location in the ocean measured from water level.

The invention claimed is:

1. An offshore ocean floating platform with docking bay, plankton pools and a raised hull made of welded steel barrels arranged in multiple layers, having an upper deck mounted above said hull including living premises and a laboratory, and equipped with multiple submersible plankton pumping towers equipped with a telescopic double acting actuator connected to a piston with a center hole and a check valve, and with an additional submersible tower supporting vertical motion of an aerated manned research vehicle from sea level and reaching down to ocean floor up to 120' depth and back up, with the double-acting telescopic actuator and with telescopic dual air supply tubes including return springs wherein said plankton pumping towers and said vehicle tower connected to seabed with water pressurized self-drilling plungers, comprising:

i. the living premises and the laboratory mounted over a floating docking hull, comprising:

a. a floating platform with a docking bay comprising multiple empty and sealed steel barrels welded to each other and arranged in multiple layers mounted above said initial layer secured to an adjacent layer with welded adaptors, thereby said docking bay barrels provide the required-buoyancy to the hull, to the docking bay, to the upper deck including living premises, to the laboratory and to the control tower b. said docking bay having multiple pools for collecting water with plankton pumped from the ocean floor by each submersible pump tower c. ocean water ballast within multiple said docking bay barrels thereby controlling the height of the floating platform in ocean water relative to water level d. said upper deck laboratory with multiple living premises assembled on the upper deck and mounted above a welded-multiple-barrel hull built above said docking bay, whereby said living premises provide for long-term accommodation for researchers, and said laboratory provides means to analyze ocean deep water research data continuously including pH, water temperature, chemical analysis, and biological analysis of plankton pumped from the ocean floor ii. each submersible plankton pumping tower comprising:

a. a long submersible tower extending from above the ocean water level to the ocean floor up to 120 feet depth constructed of multiple construction tower segments bolted to each other, each tower segment consists of multiple vertical truss segments welded together with lateral beams, and with a tower bottom-end secured to seabed dirt with multiple self-drilling metallic plungers and a top end attached above the water level to a barrel bay with cables, thereby constructing a stable construction tower submerged in ocean water, b. multiple cylinder segments bolted to each other with radial resilient seals between each segment, thereby creating a long submersible cylinder assembly with smooth cylinder bore extending from above the sea water level to up to 120 feet water depth sustaining external high water-pressure c. a submersible double-acting telescopic actuator firmly connected to a topside construction bracket of each of said submersible plankton pumping tower, extending from above the water level to 120 feet deep with an actuator end bolted to a moving piston within said cylinder bore, thereby said actuator is pushing said moving piston up and down within said cylinder bore and creating radial seal engagement with said cylinder d. said moving piston has a large through hole allowing high water and plankton flow with a check valve disk turning around a pivot pin, swinging open to allow flow upwards when the piston downwards, and said disc swinging closed when said piston moves upwards e. a bottom check valve equipped with radial seal bolted to said cylinder bottom side segment flange with a large flow hole and a check valve equipped with a disk with a pivot pin that swings open allowing water and plankton flowing from the ocean floor up when said moving piston is moving upwards, thereby filling said cylinder tube under said moving piston with water and plankton and closing flow from the ocean floor when the moving piston is moving down, iii. a T-end fitting with a lateral outlet bolted to said cylinder assembly topside flange equipped with a horizontal pipe, which has a T-fitting connection to a downward vertical pipe, thereby the water with plankton flow is directed from said cylinder segments out into said plankton pools in said docking bay said submersible vehicle tower with the manned and aerated research vehicle equipped with sealed with glass windows and with video cameras is moving vertically up and down from above the water level downwards reaching the ocean floor up to 120 feet deep by the double-acting telescopic actuator, and is aerated with two telescopic air tubes with the cylindrical internal diameter of said air tubes kept at atmospheric pressure, each tube with helical spring connected to said vehicle top on lower side and to said vehicle tower topside bracket, atmospheric pressure, each tube having one extension type helical spring connected to said vehicle top on lower side and to said vehicle tower topside bracket, comprising:
  a. said long submersible vehicle tower extending from above the ocean water level to the ocean floor up to 120 feet depth constructed of multiple construction tower segments bolted to each other, each consists of multiple vertical truss segments welded together with lateral beams, with tower bottom-end secured to seabed dirt with multiple self-drilling metallic plungers and a top end attached above the water level to barrel bay with cables, thereby constructing a stable construction vehicle tower submerged in ocean water, iv. said submersible double-acting telescopic actuator firmly connected to the topside construction bracket of said submersible vehicle tower, extending from above the water level to 120 feet deep with an actuator end bolted to said manned aerated vehicle top bracket, thereby said double-acting actuator is controlling said moving vehicle up and down travel within said submersible vehicle tower
  said submersible manned aerated vehicle has two topside through holes connected to said two telescopic air-tubes for continuous aeration with atmospheric pressure air from an air blower located on the docking bay above the sea water level and with each of two air tube inner diameter encapsulating said one extension helical spring for safety return of said vehicle to above the water level in case of any malfunction of the actuator, v. said plankton pumping tower bottom-end and said vehicle tower no bottom-end are secured to seabed dirt by multiple self-penetration and self-drilling metallic plunger powered by high water pressure cylinder and piston assembly, each comprising:
  a. a cement pole with long heavy cement-molded large diameter cylinder with conical downward-end
  b. long metallic cylinder embedded in said cement pole with a topside large diameter deep bore with smooth surface, with radial through holes connecting ocean high pressure water into the cylinder bore on the topside, extended downward with a threaded long bore with high pitch thread
  c. a large diameter movable piston with a radial resilient seal sliding along said embedded cylinder topside smooth bore with extended downward smaller diameter high-pitch threaded shaft, thereby topside seal slides within large diameter embedded cylinder and threaded into said lower cylinder, thereby high water pressure in the topside of the large diameter cylinder bore pushes said embedded piston downward while the threaded shaft creating helical motion inside mating thread in the lower cylinder
  d. said threaded piston shaft is extended out of said embedded cylinder with long plunger consisted of a threaded shank plunger with a self-drilling end made of hardened metal, thereby creating helical drilling motion by said self-drilling shank end into seabed dirt when an embedded piston sliding within said cylinder under water pressure force, thereby securing said self-penetration and a self-drilling plunger deep inside for strong support to the seabed dirt, vi. the multiple video cameras attached to the glass windows within said moving submersible manned and aerated vehicle providing continuous recorded video to screens in said living premises thereby providing scientific biological data on lives of fish and seafood deep in ocean floor up to 120 feet depth vii. a water depth gage attached to said submersible manned and aerated vehicle comprising:
  a. a gage cylinder with smoothly machined bore and with thru radial holes located on topside of the gage cylinder thereby connecting ocean water pressure into said cylinder bore
  b. a gage piston sliding within said gage cylinder having a radial groove on a piston upper side for radial sealing with a radial seal located in said radial groove in the gage piston
  c. a return spring guided by said gage piston shaft is pushing the gage piston upwards against pressurized piston force downward thereby piston travel against spring force until pressure force equals spring upward force
  d. a submersible Linear Variable Differential Transformer (LVDT) with center core firmly attached to said piston shaft and a LVDT housing transformer assembly attached to said cylinder bottom side thereby when said gage piston moves downward under ocean water pressure, the LVDT center core moved relative to said LVDT housing transformer affecting LVDT electrical output, thereby accurately reflecting depth of the submersible manned and aerated vehicle to which the gage cylinder is firmly attached, providing vehicle depth data to the upper deck laboratory.

* * * * *